(12) United States Patent
Stefanko et al.

(10) Patent No.: US 10,040,635 B2
(45) Date of Patent: Aug. 7, 2018

(54) ACTIVATED VARIABLE HEIGHT ROLLERS FOR AN ACTIVE CONTROL ROLLER TOP CONVEYING ASSEMBLY

(71) Applicant: REXNORD INDUSTRIES, LLC, Milwaukee, WI (US)

(72) Inventors: Justin Michael Stefanko, Pewaukee, WI (US); Philip Michael Gabor, Thiensville, WI (US)

(73) Assignee: REXNORD INDUSTRIES, LLC, Milwaukee, WI (US)

( * ) Notice: Subject to any disclaimer, the term of this patent is extended or adjusted under 35 U.S.C. 154(b) by 0 days.

(21) Appl. No.: 15/523,004

(22) PCT Filed: Oct. 30, 2015

(86) PCT No.: PCT/US2015/058243
§ 371 (c)(1),
(2) Date: Apr. 28, 2017

(87) PCT Pub. No.: WO2016/070000
PCT Pub. Date: May 6, 2016

(65) Prior Publication Data
US 2017/0334653 A1 Nov. 23, 2017

Related U.S. Application Data

(60) Provisional application No. 62/073,495, filed on Oct. 31, 2014.

(51) Int. Cl.
*B65G 17/24* (2006.01)
*B65G 47/88* (2006.01)

(52) U.S. Cl.
CPC ......... *B65G 17/24* (2013.01); *B65G 47/8815* (2013.01); *B65G 47/8892* (2013.01); *B65G 2205/04* (2013.01); *B65G 2811/0631* (2013.01)

(58) Field of Classification Search
CPC B65G 47/29; B65G 2811/0631; B65G 17/24; B65G 2205/04; B65G 39/20;
(Continued)

(56) References Cited

U.S. PATENT DOCUMENTS 3,621,982 A 11/1971 Fleischauer et al.
4,006,815 A 2/1977 Werntz
(Continued)

OTHER PUBLICATIONS

PCT International Search Report and Written Opinion, PCT/US2015/058243, dated Jan. 22, 2016.
(Continued)

*Primary Examiner* — Mark A Deuble
(74) *Attorney, Agent, or Firm* — Quarles & Brady LLP

(57) ABSTRACT

A modular conveying assembly that includes a plurality of roller bodies, a driving member, a positive stop body, and a positive stop actuator. Each roller body includes a top surface, a driven axle mounted to the roller body for conveyance therewith, a roller fixed to the driven axle, and a driven surface fixed to the driven axle. The rollers define a support plane. The driving member selectively engages the driven surfaces to affect rotation of the driven axle. The positive stop body is coupled to the plurality of roller bodies and includes a positive stop that is movable relative to the positive stop body between a first position and a second position. The positive stop extends above the support plane in the second position. The positive stop actuator selectively engages the positive stop to move the positive stop between the first position and the second position.

22 Claims, 23 Drawing Sheets

(58) Field of Classification Search
CPC ............ B65G 47/8815; B65G 47/8823; B65G 47/8876; B65G 47/8884; B65G 47/8892
USPC ........................................................ 198/779
See application file for complete search history.

(56) References Cited

U.S. PATENT DOCUMENTS

| | | | |
|---|---|---|---|
| 4,231,469 A | 11/1980 | Arscott | |
| 4,821,169 A | 4/1989 | Sites et al. | |
| 4,880,107 A | 11/1989 | Deal | |
| 5,040,667 A * | 8/1991 | Kamita | B65G 17/24 198/779 |
| 5,096,050 A | 3/1992 | Hodlewsky | |
| 7,537,105 B2 | 5/2009 | Fourney | |
| 8,151,978 B2 | 4/2012 | Wieting et al. | |
| 8,342,313 B2 * | 1/2013 | Wargo | B65G 17/24 198/419.1 |
| 8,701,871 B2 * | 4/2014 | Fourney | B65G 17/24 198/697 |
| 2009/0008218 A1 * | 1/2009 | Fourney | B65G 17/24 198/412 |
| 2009/0090599 A1 * | 4/2009 | Fourney | B65G 17/24 198/345.3 |
| 2011/0108396 A1 * | 5/2011 | Costanzo | B65G 17/24 198/836.1 |
| 2012/0285799 A1 * | 11/2012 | Fourney | B65G 17/24 198/459.6 |
| 2014/0116853 A1 * | 5/2014 | Chinnock | B65G 17/24 198/779 |
| 2016/0251169 A1 | 9/2016 | Stefanko | |

OTHER PUBLICATIONS

Intralox, ARB Merges: ARBb Merge Conveyors Ensure Reliable, Accurate Product Positioning, https://web.archive.org/web/20141005193214/http:/www.intralox.com:80/merges.aspx, Oct. 5, 2014 [from archive.org].

* cited by examiner

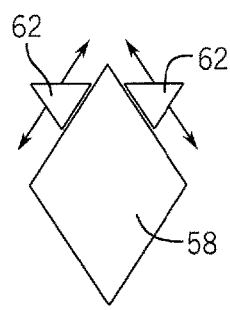 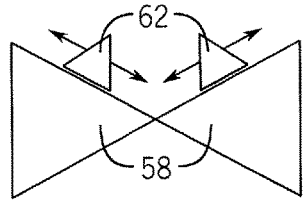 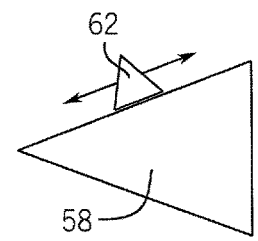
FIG. 11a     FIG. 11b     FIG. 11c
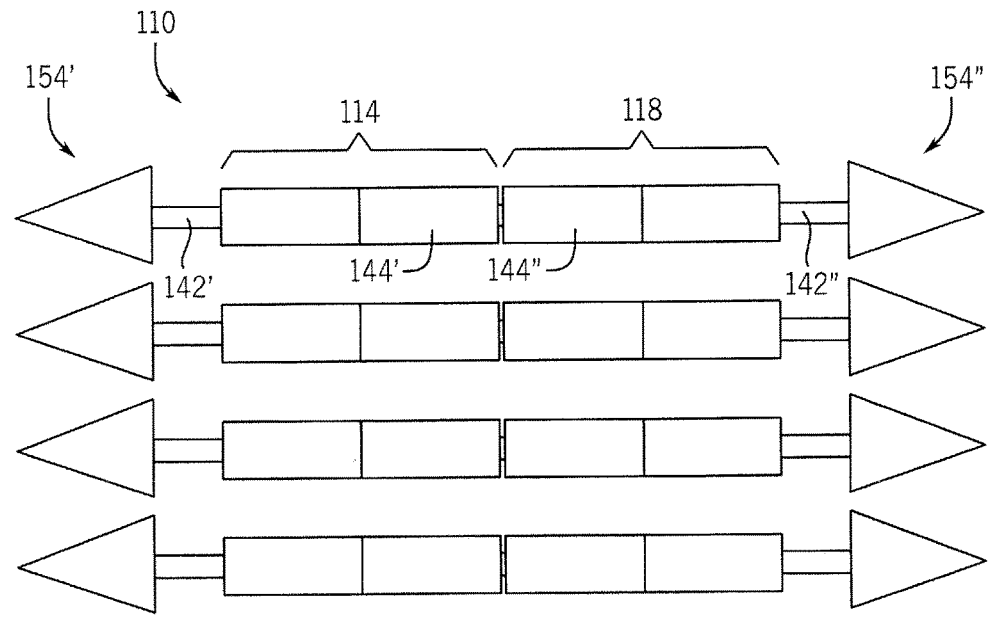
FIG. 12

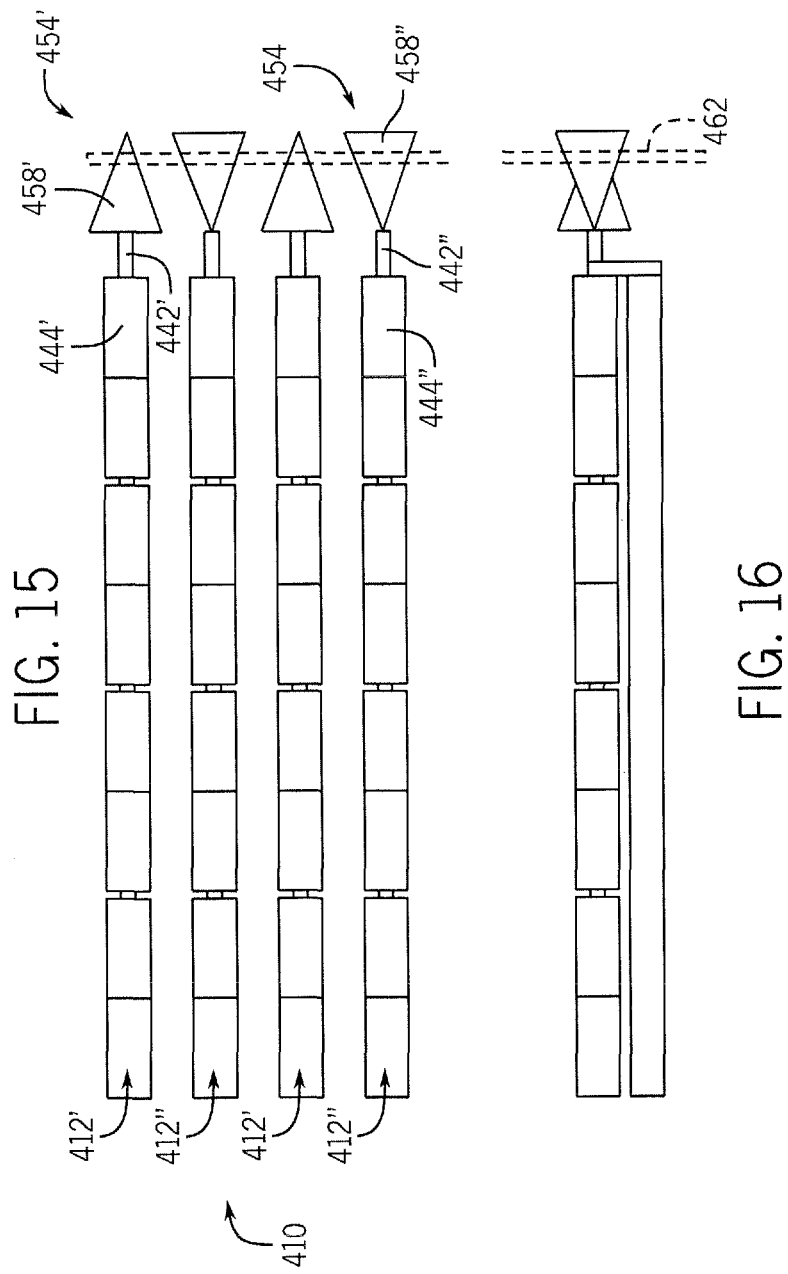

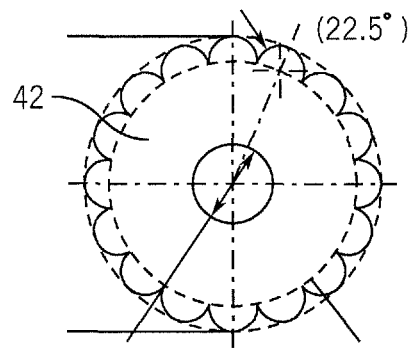 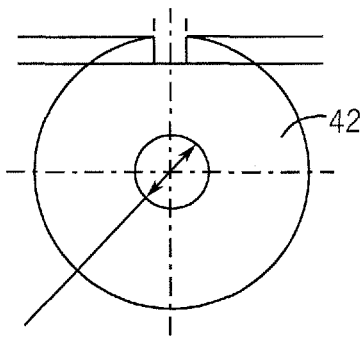
FIG. 17a  FIG. 17b
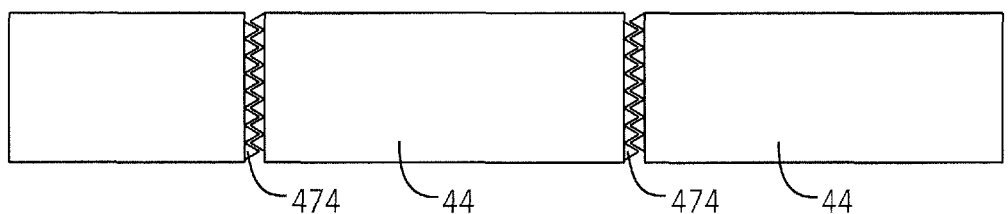
FIG. 18
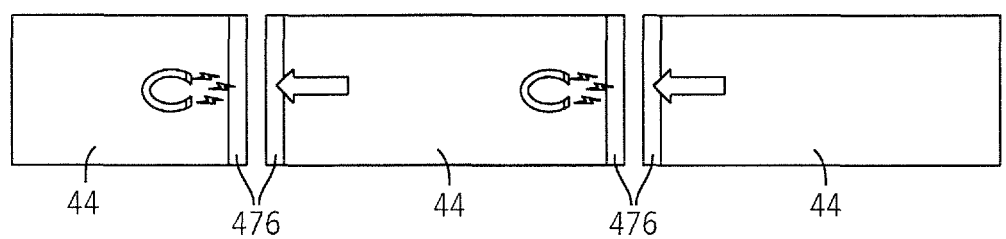
FIG. 19

ACTIVATED VARIABLE HEIGHT ROLLERS FOR AN ACTIVE CONTROL ROLLER TOP CONVEYING ASSEMBLY

CROSS-REFERENCE TO RELATED APPLICATIONS

This application represents the national stage entry of PCT International Application No. PCT/2015/058243 filed on Oct. 30, 2015, which claims the benefit of U.S. Provisional Patent Application Ser. No. 62/073,495, filed on Oct. 31, 2014, the entire contents of which are incorporated herein by reference for all purposes.

BACKGROUND OF THE INVENTION

The present invention relates to modular conveyor belts and chains, and more particularly to an active control roller top conveyor module and a modular conveying assembly including at least one of the conveyor modules.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty accumulating a product to reduce backline pressure. In addition, the belt can easily damage a high friction products during accumulation. One known solution to this problem is to rotatably mount rollers directly on the hinge pin connecting modules together, such that the hinge pin supports the rollers between hinge members. The roller rotates about an axis of rotation that is substantially coaxial with the hinge pin axis. Because it is necessary to have a portion of the roller extend above the module to engage the object being conveyed to reduce backline pressure, the required roller diameter is determined by the hinge pin location and the height of the module. Unfortunately, this often results in requiring a large diameter roller that extends both above and below the module when that configuration is not always desired. Moreover, supporting the roller on the pin alone can result in undesirable pin wear.

Another known solution for reducing backline pressure is disclosed in U.S. Pat. No. 4,231,469 issued to Arscott. In Arscott, rollers are supported by roller cradles between modules. The rollers extend above the cradle for rolling contact with an object being conveyed independent of the location of the hinge pins. The rollers reduce friction between the belt and the object. Unfortunately, assembling the roller in the cradle is difficult, requiring insertion of the roller into the cradle, and then slipping an axle or two stub axles through holes formed through the cradle walls and into the roller. The axle must then be secured to prevent it from slipping out of one of the holes formed in the cradle wall.

Rexnord Industries, LLC of Milwaukee, Wis. developed roller top conveying modules that include roller axle supports that support freewheeling rollers above a module top surface. See U.S. Pat. Nos. 8,151,978, 5,096,050, 4,880,107, and 4,821,169. These modules are easily assembled and do not require oversize rollers extending through the conveyor modules. These prior art modules allow accumulation of product being conveyed by a conveying system formed from modules by providing a low backline pressure when the products are stopped on the moving modules. Absent individual external stops for each product being conveyed, the conveyed products engage other products when accumulating on the conveyor system.

SUMMARY OF THE INVENTION

The present invention provides a modular conveying assembly with active roller control for reducing backline pressure without product to product contact when accumulating products. The conveying assembly includes a first roller belt module having a top surface and at least one first roller axle support extending above the top surface. The first axle support supports at least one roller above the top surface. The at least one roller is rotatably coupled to a rotatably driven drive axle, such that rotation of the drive axle causes rotation of the roller. A clutch including a driven surface fixed to the drive axle engages a driving member to rotatably drive the drive axle and, thus the roller.

A general objective of the present invention is to provide a belt module and a modular conveying assembly formed therefrom that can accumulate objects without product to product contact. This objective is accomplished by providing a conveyor belt module having an actively driven roller rotatably supported above the conveyor module body top surface.

This and still other objectives and advantages of the present invention will be apparent from the description which follows. In the detailed description below, preferred embodiments of the invention will be described in reference to the accompanying drawing. These embodiments do not represent the full scope of the invention. Rather, the invention may be employed in other embodiments. Reference should therefore be made to the claims herein for interpreting the breadth of the invention.

In one embodiment, the invention provides a modular conveying assembly that includes a plurality of roller bodies, a driving member, a positive stop body, and a positive stop actuator. Each roller body includes a top surface, a driven axle mounted to the roller body for conveyance therewith, a roller fixed to the driven axle, and a driven surface fixed to the driven axle. The rollers define a support plane. The driving member selectively engages the driven surfaces to affect rotation of the driven axle. The positive stop body is coupled to the plurality of roller bodies and includes a positive stop that is movable relative to the positive stop body between a first position and a second position. The positive stop extends above the support plane in the second position. The positive stop actuator selectively engages the positive stop to move the positive stop between the first position and the second position.

In another embodiment, the invention provides a method of conveying an object on a modular conveying assembly. The method includes moving a plurality of roller bodies and a positive stop body at a conveyance speed, supporting the object on rollers attached to the roller bodies, conveying the object in a conveying direction at the conveyance speed, engaging a positive stop with a positive stop actuator to move the positive stop into a position that extends above the rollers, and engaging a driving member with a driven surface of at least one roller body to affect rotation of a driven axle and bias the object toward the positive stop.

BRIEF DESCRIPTION OF THE DRAWINGS

FIG. 1 is a perspective view of a modular conveyor belt assembly according to the.

FIGS. 11a-c are side views of various clutch assemblies according to the invention.

FIG. 12 is a top view of a two-zone modular conveyor belt assembly according to the invention.

FIG. 15 is a top view of a modular conveyor belt assembly according to the invention that includes two different motion zones.

FIG. 16 is a front view of the modular conveyor belt assembly of FIG. 15.

FIGS. 17a and 17b are section views of roller axles according to the invention.

FIG. 18 is a top view of a toothed connection between rollers.

FIG. 19 is a top view of a magnetic connection between rollers.

DETAILED DESCRIPTION OF PREFERRED EMBODIMENTS

Figure 1:
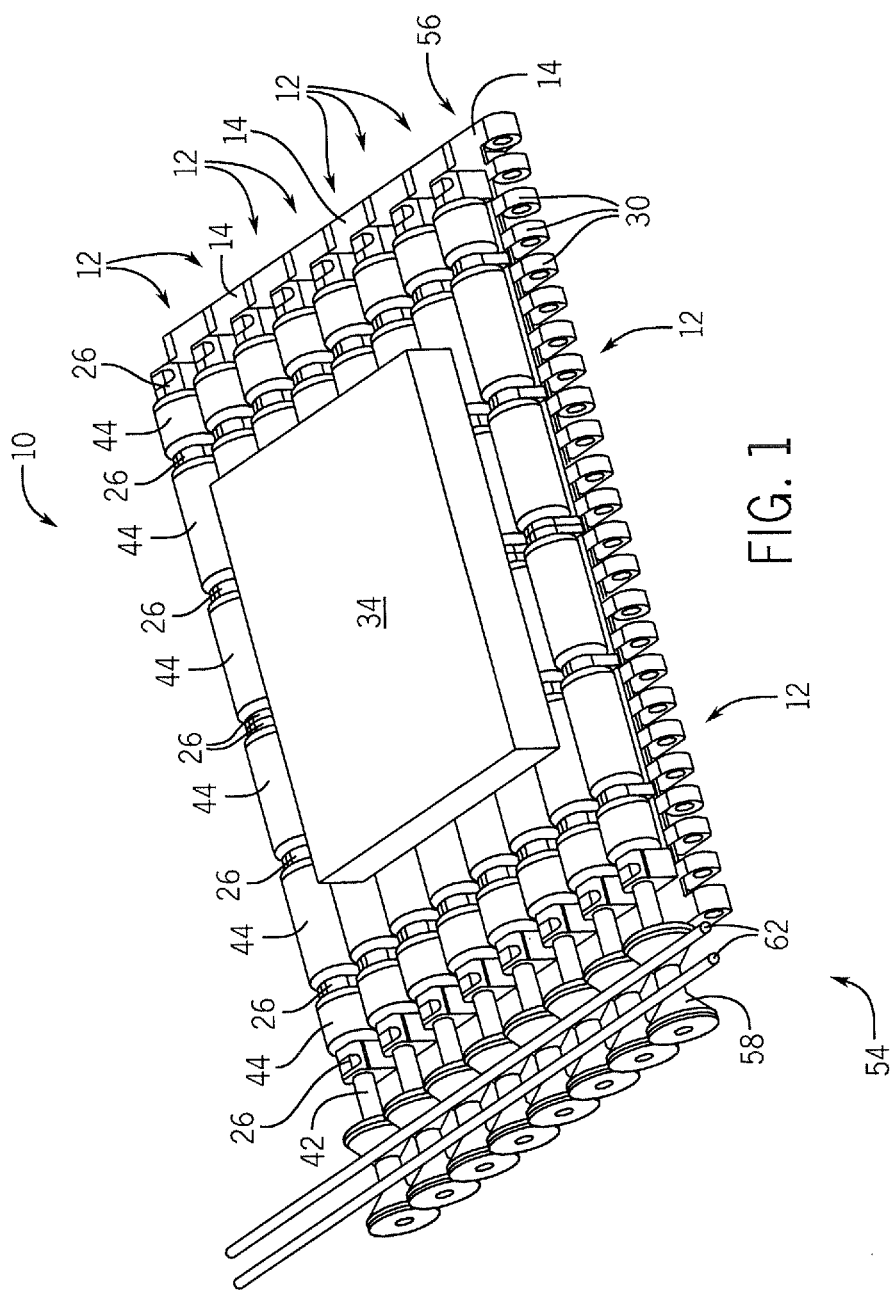

A modular conveying assembly, or belt 10, shown in FIG. 1, includes a plurality of belt modules 12 assembled in an edge to edge relation to form the continuous belt 10. Hinge pins 40 (see FIG. 2) join adjacent modules 12, and pivotally connect the adjacent modules 12 in the direction of belt travel. Roller axle supports 26 extending upwardly from a module body 14 of each belt module 12 support a roller axle 42 (see FIG. 2) having a plurality of rollers 44 fixed thereto. The rollers 44 rotatably engage an object 34 being conveyed by the belt 10 to reduce friction between the belt 10 and the object and, as described below, selectively convey the object relative to the module body 14. The modules 12 are preferably formed using methods known in the art, such as injection molding, from materials known in the art, such as acetal, polyethylene, polypropylene, nylon, and the like.

Figure 3:
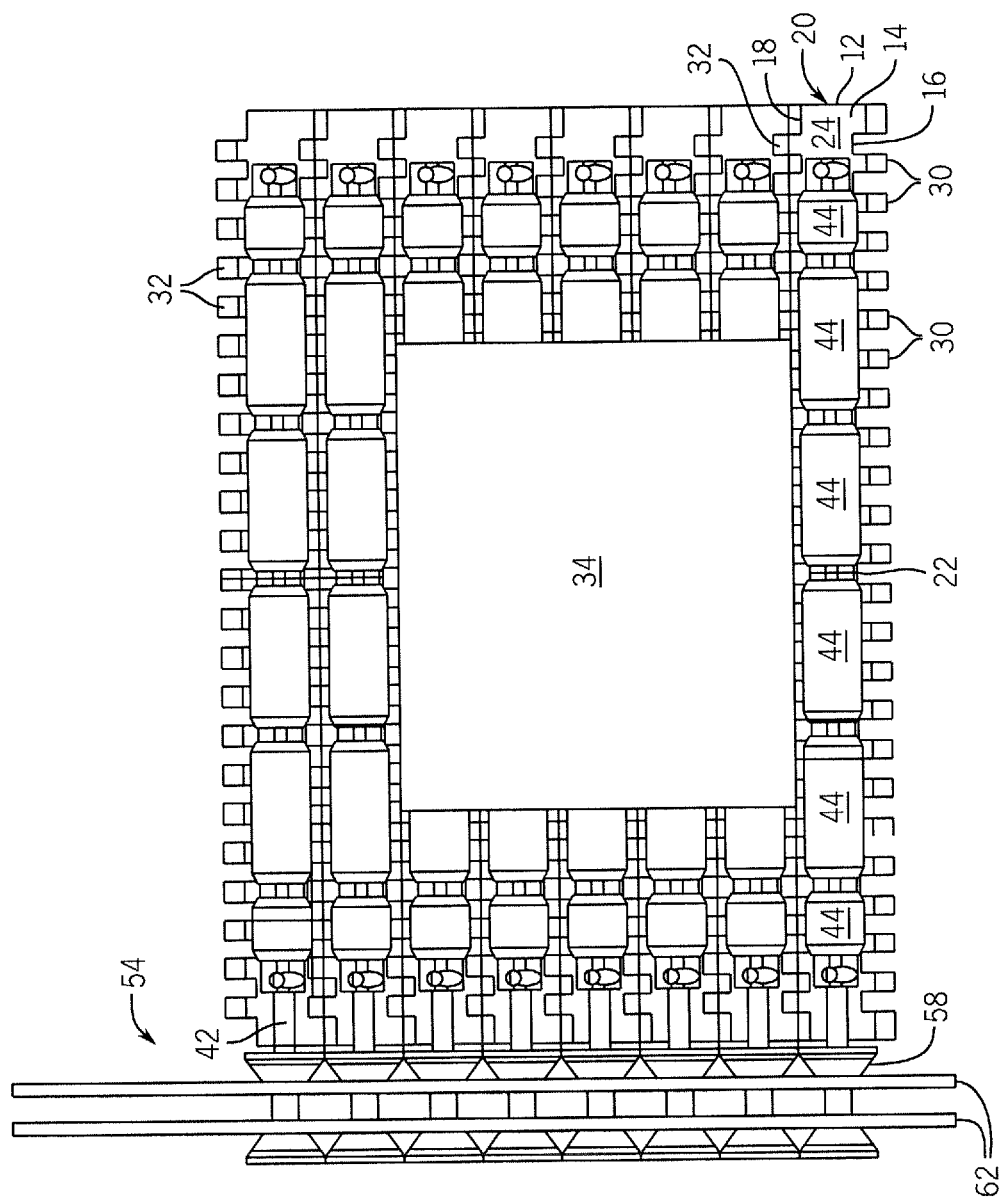
FIG. 3 is a top view of the assembly shown FIG. 1.
Figure 4:
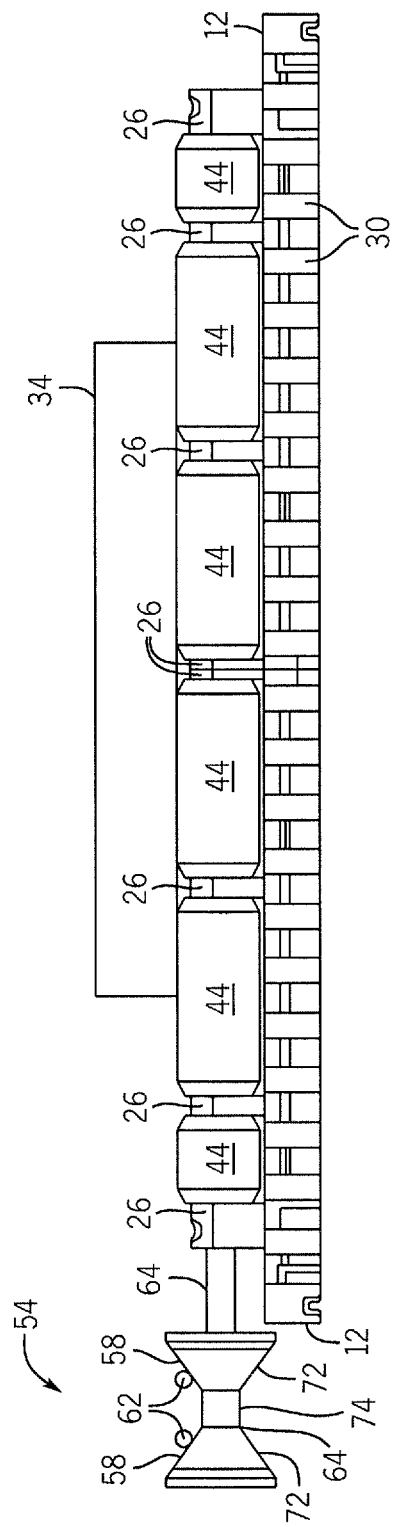
FIG. 4 is a front view of the assembly shown FIG. 1.

Each module 12 includes a body 14 having a top surface 24 (see FIG. 3) surrounded by a leading edge 16 and trailing edge 18 joined by a first side edge 20 and a second side edge 22. Although, the terms "leading" and "trailing" are used to identify features of the module 12, the module 12 described herein can be used in any direction, or orientation without departing from the scope of the invention. Advantageously, the top surface 24 can prevent products from falling through the belt 10. Of course, the top surface 24 can also have perforations to allow air or fluid flow for cooling, drafting, and/or draining. The module body 14 has a width which is defined by the distance between the side edges 20, 22, and a length which is defined by the distance between the leading and trailing edges 16, 18.

Figure 2:
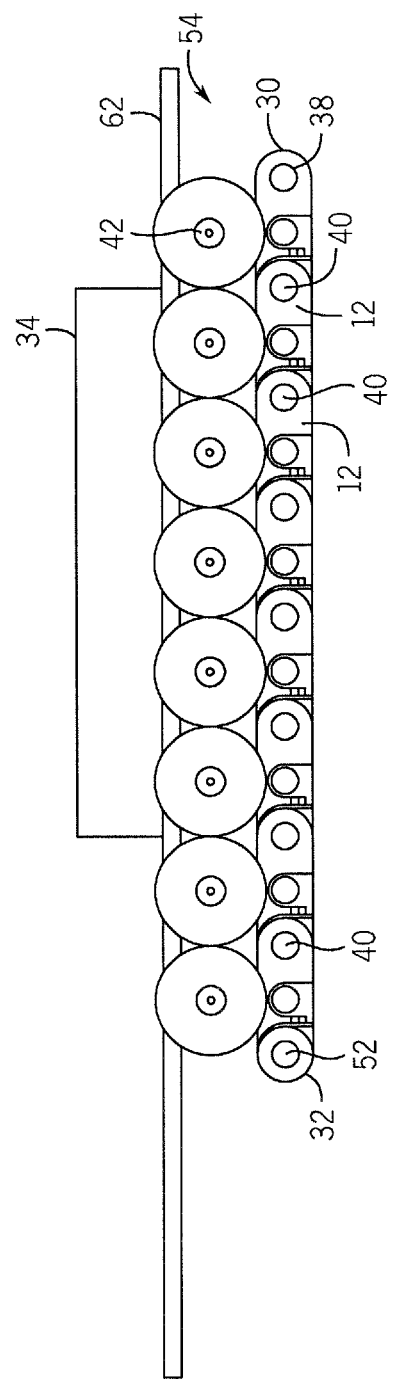
FIG. 2 is a side view of the assembly shown in FIG. 1.

With reference to FIG. 2, each leading edge hinge member 30 extends forwardly from the leading edge 16 of the module body 14, and includes a coaxial opening 38 for receiving the hinge pin 40. Each leading edge hinge member opening 38 receives the hinge pin 40 pivotally connecting the leading edge hinge members 30 of one module 12 to trailing edge hinge members 32 of an upstream module 12. The leading edge hinge members 30 intermesh with trailing edge hinge members 32 extending rearwardly from the trailing edge 18 also include coaxial openings 52. The trailing edge hinge members 32 include coaxial openings 52 that receive the hinge pin 40 to pivotally connect the trailing edge hinge members 32 of the module 12 to leading edge hinge members 30 of a downstream module 12.

The roller axle supports 26 are spaced across the module top surface 24 in a row 56 transverse to the direction of conveyor travel. Each axle support 26 includes a coaxial opening 46 for receiving the roller axle 42. Advantageously, the plurality of axle supports 26 do not allow the roller axle 42 to pop upwardly away from the modules 12 if the roller 44 or roller axle 42 catches an object. Although a plurality of axle supports 26 in a single row on each module 12 is shown, a single axle support extending upwardly from the module top surface forming a row or a plurality of axle support rows on a single module can be provided without departing from the scope of the invention.

The roller axle 42 can be formed from any material, such as a polymeric material, metal, and the like. Polymeric roller axles 42 are preferred because they are lighter and produce less noise. Each roller axle 42 supports a plurality of the rollers 44. Preferably, a single roller 44 is disposed between a pair of axle supports 26, however, a plurality of rollers 44 can be provided between a pair of axle supports 26 without departing from the scope of the The rollers 44 support the object 34 being conveyed by the belt 10 above the module body 14 and are rotatably fixed to the roller axle 42. At least a portion of each roller 44 extends above the roller axle supports 26 to engage the object being conveyed by the belt 10. Preferably, each roller 44 is molded from a plastic, and includes a through hole 46 formed there through for receiving the roller axle 42. The rollers 44 can be rotatably fixed to the roller axle 42 using methods known in the art, such as by chemically bonding the roller 44 to the axle 42, fusing the roller 44 to the roller axle 42, integrally forming the roller axle 42 and roller 44 as a single piece, forming a through hole axially through the roller 44 with a noncircular cross section and inserting the roller axle 42 having a complementary cross section through the roller 44 through hole, and the like without departing from the scope of the invention. Although a plastic roller is disclosed, the roller can be formed from any material, such as elastomers, metals, and the like, suitable for the particular application without departing from the scope of the invention.

The roller axle 42, and thus the rollers 44 are selectively rotatably driven to accumulate objects on the conveyor system without excessive product to product contact and/or to selectively space objects conveyed by the conveying system. In the embodiment shown in FIGS. 1-4, the roller axle 42 is actively driven by a clutch 54 having a driven surface 58 fixed to one end of the roller axle 42 and a fixed driving member 62, or bar, adjacent the belt 10. The driving member 62 engages the driven surface 58 to rotatably drive the roller axle 42, and thus the roller 44. In a preferred embodiment, movement of the conveyor module 12 relative to the fixed driving member 62 engaging the driven surface 58 of the clutch 54 causes the driven surface 58, and thus, the roller axle 42 and rollers 44 to rotate.

In one embodiment, the driven surface 58 is conical to control the rotational speed of the roller 44 without changing the conveying speed of the belt 10. In particular, the rotational speed of the roller 44 varies by engaging the conical driven surface 58 at different radii of the conical driven surface 58 with the driving member 62. As a result, when the belt 10 travels at a constant conveying speed, the rollers 44 will rotate faster when the fixed driving member 62 engages a small radial cross section of the conical driven surface 58, i.e. proximal an apex 64 of the conical driven surface 58 (see FIG. 4), compared to the rotational speed of the rollers 44 when the fixed driving member 62 engages a larger radial cross section of the conical driven surface 58.

Figure 5:
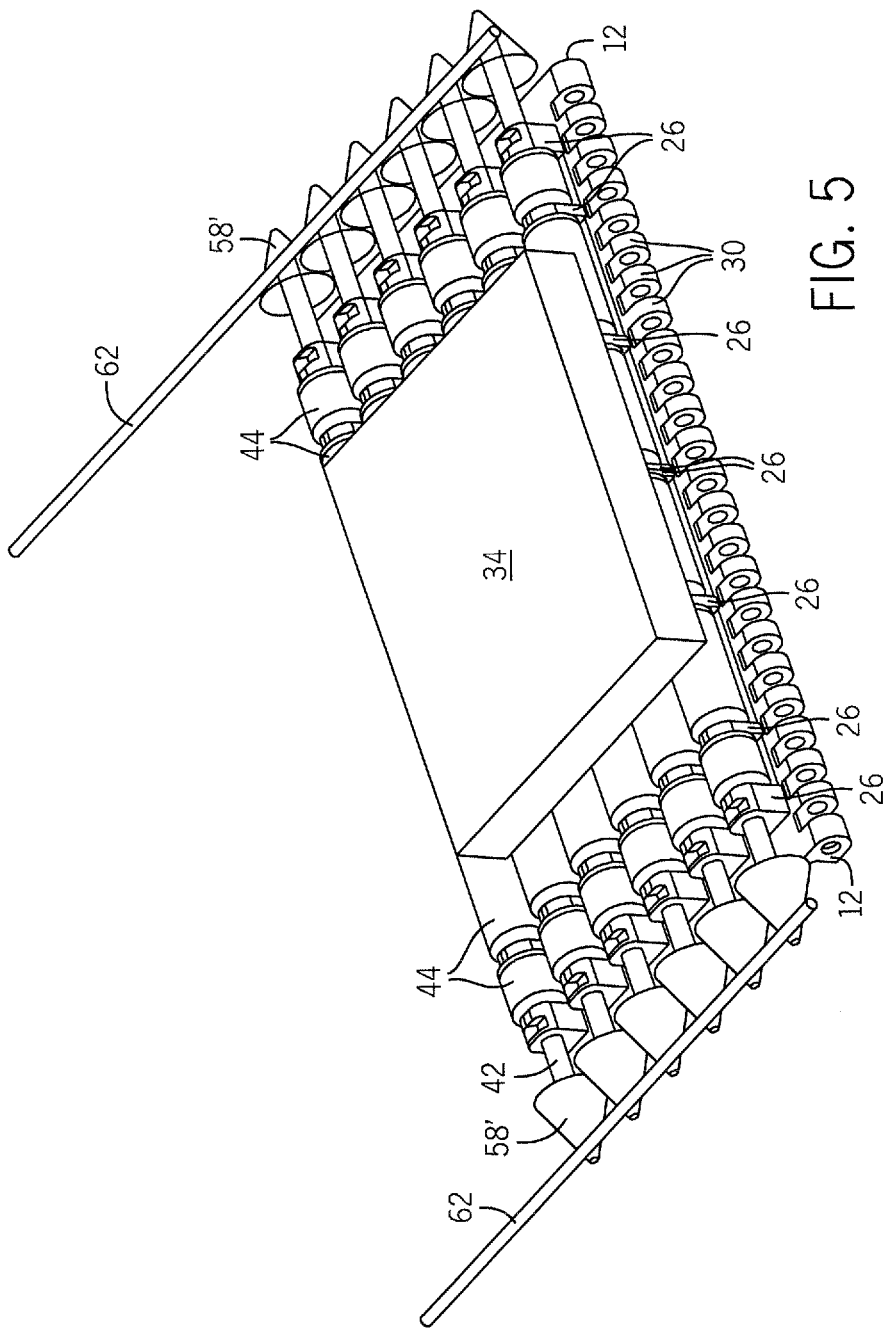
FIG. 5 is a front view of another modular conveyor assembly according to the invention and having rollers driven from both sides of the assembly.
Figure 6:
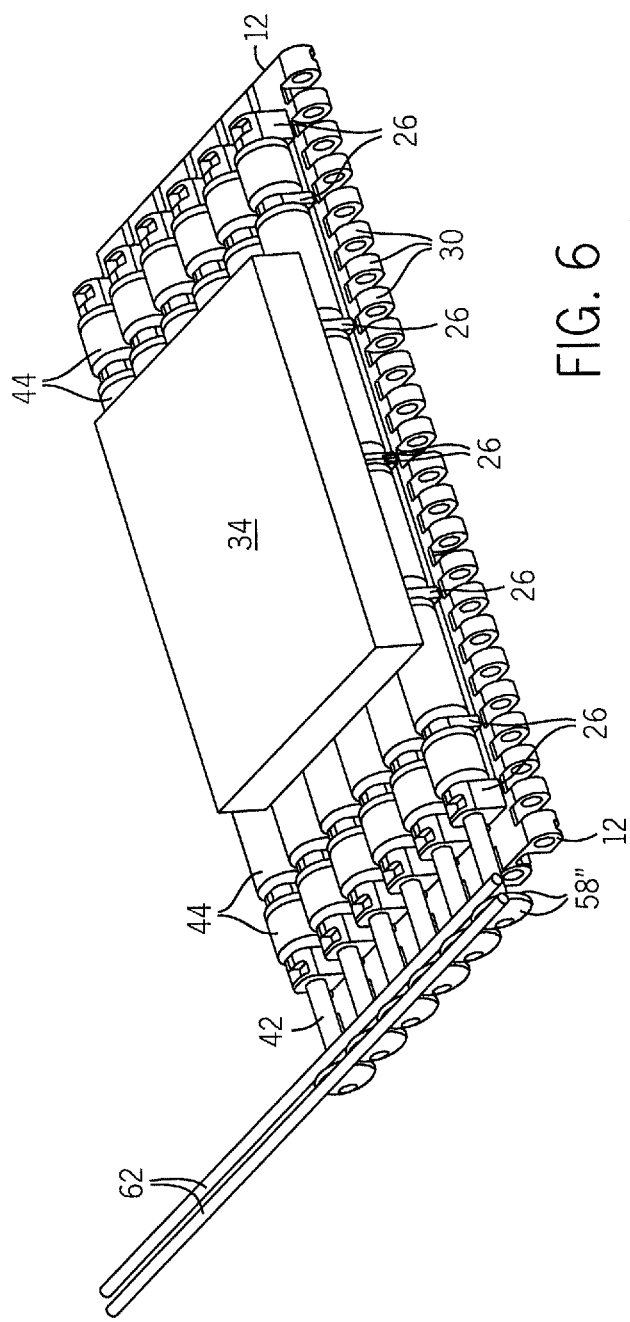
FIG. 6 is a perspective view of another modular conveyor assembly according to the invention in which the driven axle rotatably drives a roller axle defining an angle with the driven axle.

In the embodiment disclosed in FIGS. 1-4, the driven surface 58 is formed having two conical driven surfaces 72 forming part of two cones joined at their apex by a cylindrical driven surface 74. The driven surface 58, however, can be any shape compatible with the driving member without departing from the scope of the invention. For example, the driven surface 58' can be a single conical surface, such as shown in FIG. 5, cylindrical, frustoconical, two frustoconical surfaces 58" joined at their base, such as shown in FIG. 6, have teeth engageable with a toothed rack driving member, stepped, and the like. Moreover, although the driven surface 58 is shown on one end of the roller axle 42, the driven surface 58 can be on both ends of the roller axle 42, such as shown in FIG. 5, between the roller axle ends, or fixed to a driven axle coupled to the roller axle 42 without departing from the scope of the invention. Although a driven surface 58 separate from the rollers 44 is shown, the driven surface can be an outer surface of one or more of the rollers 44 without departing from the scope of the invention.

In a preferred embodiment, the driving member 62 is at least one bar positioned adjacent modules 12 of the belt 10 and arranged in a direction extending in the conveying direction. The driving member 62 is fixed relative to the conveying direction of the modules 12 and selectively engagable with the different locations on the driven surface 58 to rotatably drive the roller axle. In a preferred embodiment, the driving member 62 is selectively lowered into engagement with the driven surface 58. In another embodiment, multiple driving members 62 are disposed above the driven surface 58 and one of the driving members 62 is selectively engaged with the driven surface 58 depending upon the desired rotational speed of the roller axle 42. Although a driving member 62 fixed relative to the conveying direction of the modules 12 is shown, the driving member can be movable relative to the conveying direction of the modules, such as an endless driven belt engaging the driven surface, without departing the scope of the invention.

Figure 7A:
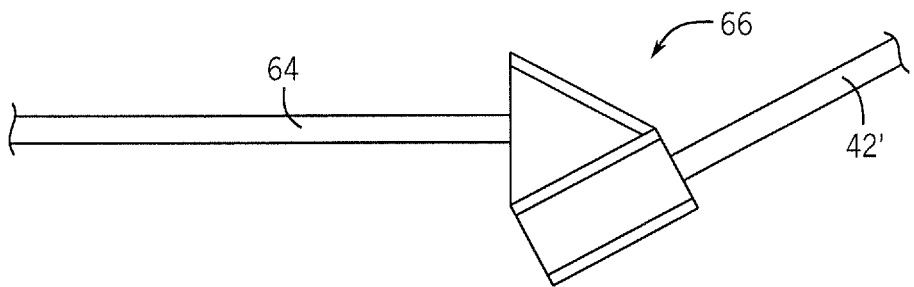
FIG. 7a is a front view of an alternative axle arrangement including a driven axle that rotatably drives a roller axle arranged at an angle with respect to the driven axle.
Figure 7B:
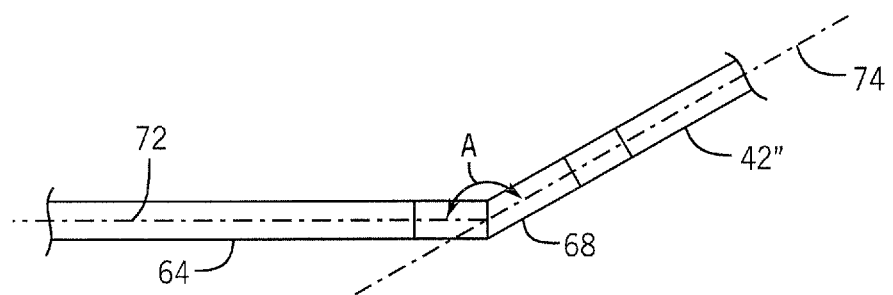
FIG. 7b is a front view of an alternative axle arrangement including a driven axle that rotatably drives a roller axle arranged at an angle with respect to the driven axle.
Figure 8:
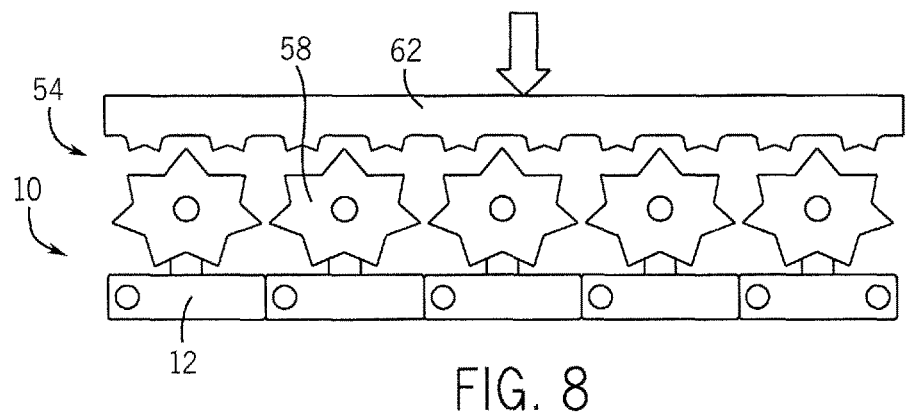
FIG. 8 is a side view of another modular conveyor belt assembly according to the invention and having toothed clutch assembly.

In the embodiment described above, the roller axle 42 is the driven axle. However, as shown in FIG. 7a, the embodiments described herein can include a separate driven axle 64 coupled to the roller axle 42' to provide other advantages. For example, the driven axle 64 can be coupled to the roller axle 42', such as by a frictional engagement or gear mechanism 66 that rotatably drives the roller axle 42' counter to the rotational direction of the driven axle 64 in order to urge objects on the rollers in the direction of conveyor travel and space the objects on the conveyor. If a gear mechanism is used, the mechanism can include an intermediate gear that rotates the roller axle in the same direction as the driven axle. Alternatively, as shown in FIG. 7b, the driven axle 64 can be coupled to a roller axle 42" by a flexible coupling 68, such as a tube engaging ends of the driven axle 64 and roller axle 42". The flexible coupling 68 allows a longitudinal axis 72 of the roller axle 42" to define an angle A with a longitudinal axis 74 of the driven axle 64, such that rollers fixed to and coaxial with the roller axle urge objects onto or off of the belt 10.

When the modules 12 are configured in a belt arrangement, i.e. two or more modules 12 define the belt width and are arranged in a side edge to side edge and leading edge to trailing edge configuration. In a belt that is multiple modules wide, the roller axles can be driven independently or extend across modules, either as a single axle or multiple axles coupled together. Moreover, as shown in FIG. 5, the roller axle can be driven from one or both sides of the belt with a driven surface fixed on each driven axle. Advantageously, when independent axles are driven by opposite sides of the belt, conveyed product can be accumulated side by side or a conveyed product can be oriented on the belt by driving the driven axle coupled to a driven surface on one side of the belt in a direction opposite of the driven axle coupled to a driven surface of the other side of the belt to spin the conveyed product on the belt.

The belt 10 is assembled by intermeshing the trailing edge hinge members 32 of one of the modules 12 with the leading edge hinge members 30 of the adjacent module 12, such that the trailing hinge member openings 52 of the one module 12 are aligned with and the leading edge hinge member openings 38 of the other module 12. A hinge pin 40 is then slipped through the aligned hinge member openings 38, 52 to pivotally link the adjacent modules 12 together.

Several alternate constructions of the inventive concept will be discussed below with respect to FIGS. 9-26.

Figure 9:
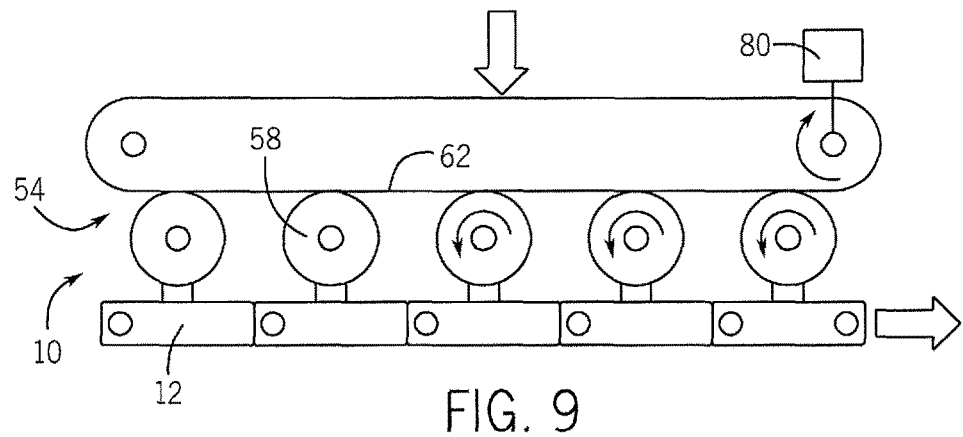
FIG. 9 is a side view of another modular conveyor belt assembly according to the invention and having a driving member including a motor driven belt.

FIG. 9 shows an alternate embodiment wherein the clutch 54 includes toothed driven surfaces 58 and a corresponding toothed driving member 62. The teeth can be corresponding star shapes, or the teeth may be acme gears or another gear shape, as desired. For example, the driven surfaces 58 and driving members 62 may be arranged similar to a rack and pinion. Similar to the embodiment illustrated in FIGS. 1-4 the driving member 62 may be a stationary element that is raised and lowered into engagement with the driven surfaces 58 to effect rotation of the rollers 44.

Figure 10:
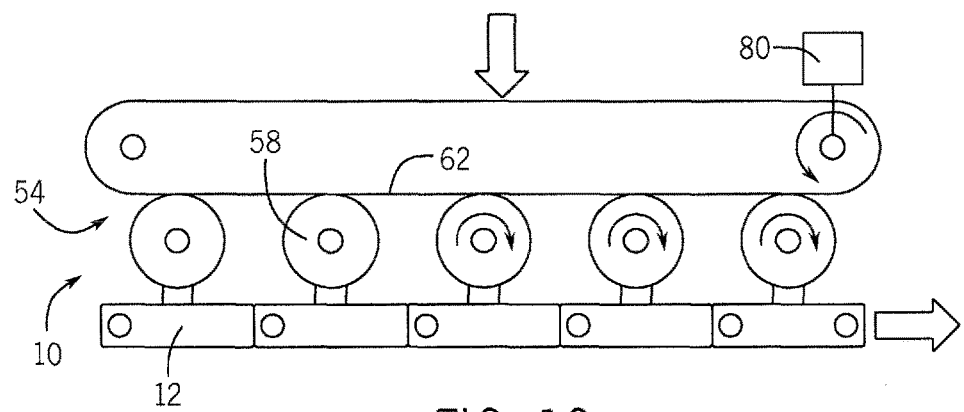
FIG. 10 is a side view of the modular conveyor belt assembly of FIG. 9 showing the motor driven belt rotating in a direction opposite of that shown in FIG. 9.

FIGS. 9 and 10 show an alternate embodiment wherein the driving member 62 is a continuous belt driven by a motor 80. The motor 80 may be a constant speed motor or a variable speed motor, as desired. The motor 80 is arranged to selectively drive the driving member 62 to affect the behavior of the rollers 44. For example, in FIG. 9 the motor 80 is rotating the driving member 62 such that the rollers 44 are rotated to accumulate the object 34, In FIG. 10 the motor 80 is driven in an opposite direction such that objects are accelerated along the rollers 44. The rotation of the rollers 44 may be affected to produce the relative motion of the object 34 as desired. For example, the level of deceleration and/or acceleration can be varied. In addition, a number of zones may be arranged along the direction of travel, each zone including a separate belt 62 and motor 80, such that sequential object 34 manipulation is provided.

FIGS. 11*a-c* show various constructions of the driven surface 58 and the driving member 62. FIG. 11*a* depicts a cross-sectional view of a driven surface 58 that defines a diamond shaped cross section. Two driving members 62 are arranged to engage the driven surface 58 at varying positions along the driven surface 58 such that the rollers 44 would be driven at differing speeds as discussed above. Preferably, the two driving members 62 would be positioned in mirrored positions to provide consistent driving action to the rollers 44.

FIG. 11*b* depicts a cross-sectional view of a driven surface 58 that defines an hourglass shaped cross section. Two driving members 62 are arranged to engage the driven surface 58 at varying positions along the driven surface 58 such that the rollers 44 would be driven at differing speeds as discussed above. Preferably, the two driving members 62 would be positioned in mirrored positions to provide consistent driving action to the rollers 44.

FIG. 11*c* depicts a cross-sectional view of a driven surface 58 that defines conical shape. One driving member 62 is arranged to engage the driven surface 58 at varying positions along the driven surface 58 such that the rollers 44 would be driven at differing speeds as discussed above.

FIG. 12 shows a modular conveying assembly 110 that includes a first motion zone 114 and a second motion zone 118. The first motion zone 114 includes an independent clutch 154' connected to rollers 144' by a roller axle 142'. The second motion zone 118 includes an independent clutch 154" connected to rollers 144" by a roller axle 142". The motion zones 114, 118 are operated independent of one another to create differing motion profiles.

Figure 13:
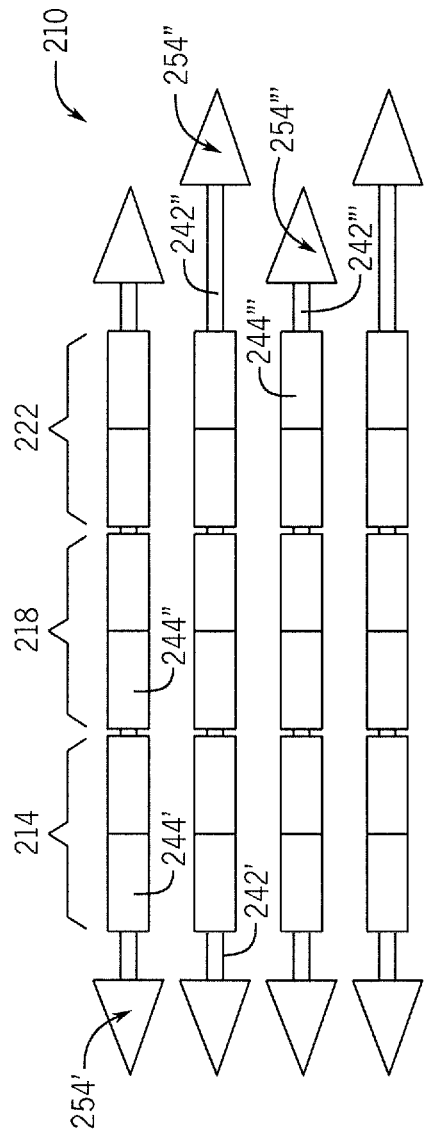
FIG. 13 is a top view of a three-zone modular conveyor belt assembly according to the invention.

FIG. 13 shows a modular conveying assembly 210 that includes a first motion zone 214, a second motion zone 218, and a third motion zone 222. The first motion zone 214 includes an independent clutch 254' connected to rollers 244' by a roller axle 242'. The second motion zone 218 includes an independent clutch 254" connected to rollers 244" by a roller axle 242". The third motion zone 222 includes an independent clutch 254''' connected to rollers 244''' by a roller axle 242'''. In the illustrated embodiment, the clutch 254" and the clutch 254''' are cantilevered past the right (as viewed in FIG. 13) end of the conveying assembly 210 and are staggered from one another in the width direction. The motion zones 214, 218, 222 are operated independent of one another to create differing motion profiles.

Figure 14:
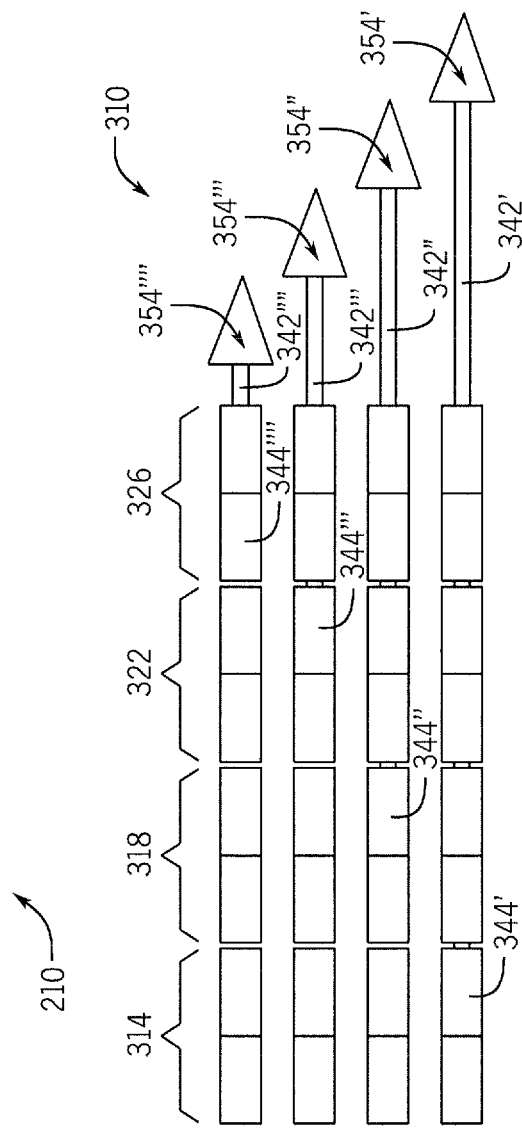
FIG. 14 is a top view of a four-zone modular conveyor belt assembly according to the invention.

FIG. 14 shows a modular conveying assembly 310 that includes a first motion zone 314, a second motion zone 318, a third motion zone 322, and a fourth motion zone 326. The first motion zone 314 includes an independent clutch 354' connected to rollers 344' by a roller axle 342'. The second motion zone 318 includes an independent clutch 354" connected to rollers 344" by a roller axle 342". The third motion zone 322 includes an independent clutch 354''' connected to rollers 344''' by a roller axle 342'''. The fourth motion zone 326 includes an independent clutch 354'''' connected to rollers 344'''' by a roller axle 342''''. In the illustrated embodiment, the clutches 354', 354", 354'''', and 354'''' are all cantilevered past the end of the conveying assembly 310 on a single side and are staggered from one another in the width direction. The motion zones 314, 318, 322, 326 are operated independent of one another to create differing motion profiles.

FIGS. 15 and 16 show a modular conveying assembly 410 that includes a first series of modules 412' and a second series of modules 412". The first series of modules 412' includes an independent clutch 454' including a driven surface 458' connected to rollers 444' by a roller axle 442'. The second series of modules 412" includes an independent clutch 454" including a driven surface 458" connected to rollers 444" by a roller axle 442". In the modular conveyor assembly 410, the driven surface 258' and the driven surface 258" are arranged in opposite orientations. In this configuration, when the driving member 462 is engaged with the driven surfaces 258' and 258" the speed of rotation of the rollers 244' and 244" will depend on the side-to-side position of the driving element 462. For example, if the driving element 462 is moved to the right in the depiction of FIG. 15, the rollers 444' of the first series of modules 412' will increase its rotational speed and the rollers 444" of the second series of modules 412" will decrease in rotational speed. In this way, various adjustable motion profiles are attainable.

FIGS. 17*a* and 17*b* show cross sections of two exemplary roller axles 42. As shown, the roller axle 42 may define a spline shape, or a keyway. Additionally, the roller axle my define other shapes (e.g., square oval, pegged, star, et cetera).

FIG. 18 shows how rollers 44 may be end connected to one another by teeth 474. FIG. 19 shows how rollers 44 may be end connected to one another by magnets 476. These connections between rollers 44 provide a way to transfer rotation without rigidly joining the rollers to the roller axle 42. Other configurations are contemplated for coupling the rollers together independent of the roller axle 42. For example, couplings, taper locks, and other connection types are usable.

Figure 20:
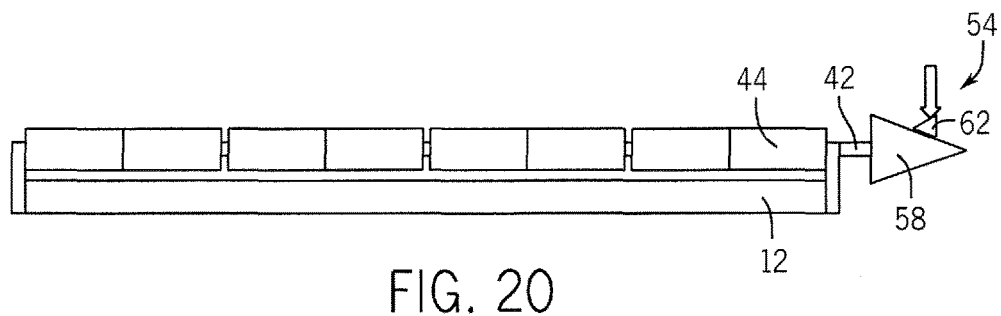
FIG. 20 is a front view of a radially actuated clutch on a modular conveyor belt assembly according to the invention.
Figure 21:
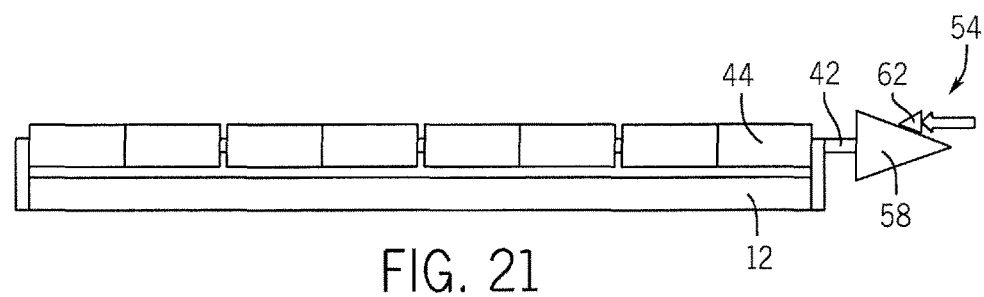
FIG. 21 is a front view of an axially actuated clutch on a modular conveyor belt assembly according to the invention.

FIGS. 20 and 21 illustrate how the driving member 62 may be actuated vertically or horizontally in and out of engagement with the driven surface 58. Any actuation scheme may be used to bring the driving member 62 into contact with the driven surface 58, as desired.

Figure 22:
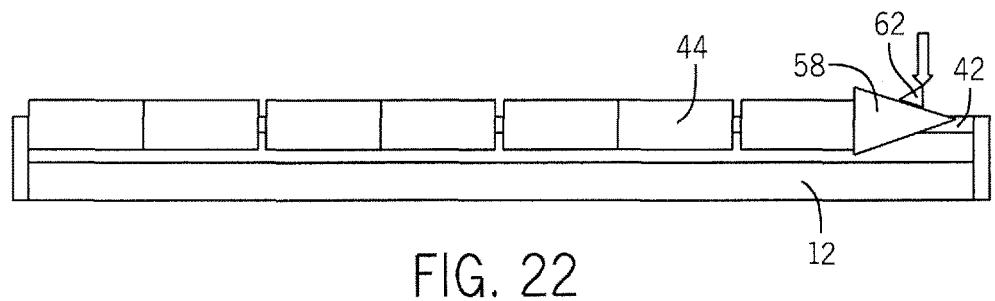
FIG. 22 is a front view of a modular conveyor belt assembly according to the invention that includes an inset clutch assembly.

FIG. 22 shows how the driven surface 58 may be inset on the module 12 as opposed to cantilevered.

Figure 23:
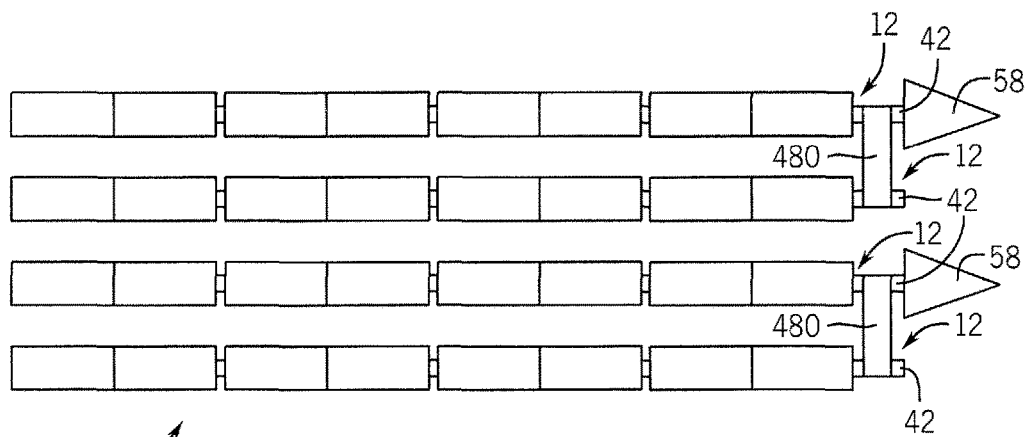
FIG. 23 is a top view of a modular conveyor belt assembly according to the invention that includes master and slave rollers.

FIG. 23 shows an arrangement where every other module 12 in the belt 10 does not include a driven surface 58 but it rather tied to an adjacent driven surface 58 by a belt 480 or other linkage capable of transferring the rotation from the driven surface 58 to the passive modules 12.

Figure 24:
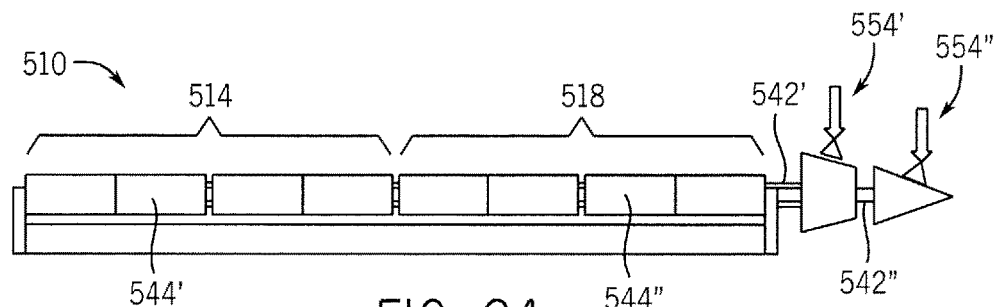
FIG. 24 is a front view of a modular conveyor belt assembly according to the invention that includes two different motion zones and coaxial roller axles.

FIG. 24 shows a modular conveying assembly 510 that includes a first motion zone 514 and a second motion zone 518. The first motion zone 514 includes an independent clutch 554' connected to rollers 544' by a first roller axle 542'. The second motion zone 518 includes an independent clutch 554" connected to rollers 544" by a second roller axle 542". The first roller axle 542' and the second roller axle 542" are arranged coaxially, with the first roller axle 542' arranged within the second roller axle 542". The motion zones 514, 518 are operated independent of one another to create differing motion profiles.

Figure 25:
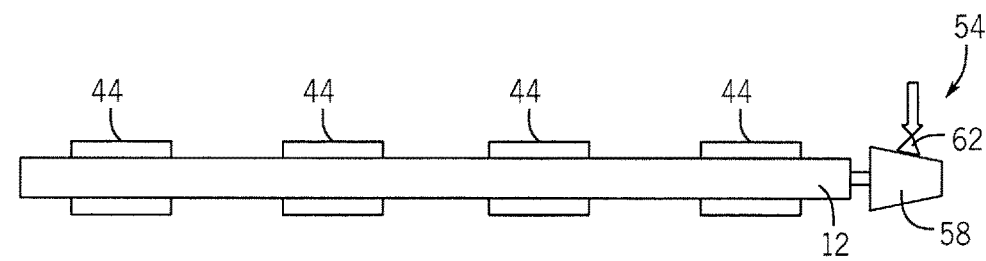
FIG. 25 is a front view of a modular conveyor belt assembly according to the invention that includes rollers that are mounted within the link and a cantilevered clutch assembly.
Figure 26:
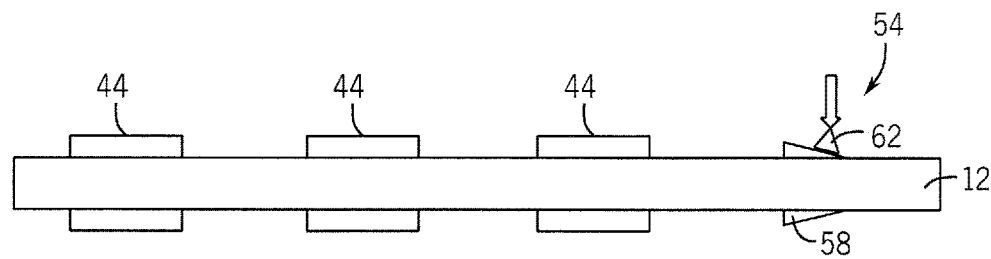
FIG. 26 is a front view of a modular conveyor belt assembly according to the invention that includes rollers that are mounted within the link and an inset clutch assembly.

FIGS. 25 and 26 illustrate how the rollers 44 may be set within the web of the module 12 without being raised above the surface 24 by the supports 26. FIG. 25 shows the clutch 54 cantilevered and FIG. 26 shows the clutch 54 set within the web of the module 12.

Figure 27:
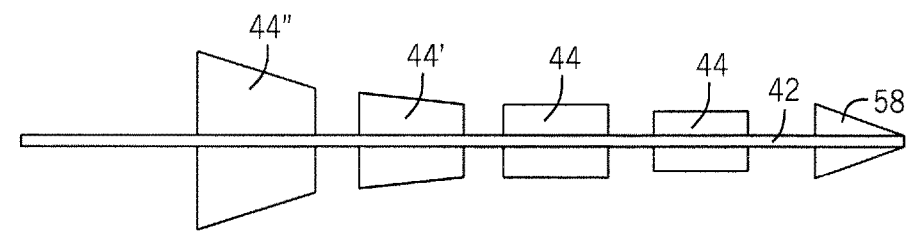
FIG. 27 is a front view of a modular conveyor belt assembly according to the invention that includes shaped rollers.

FIG. 27 shows an example of how the rollers 44 may have different shapes to provide different motion profiles of the object 34. In the illustrated embodiment, rollers 44 have a consistent diameter and are generally cylindrically shaped. Rollers 44' and 44" are generally conically shaped such that they would tend to move the object 34 to the right (as viewed in FIG. 27). Other roller shapes are considered including different arrangements of shapes. These shaped rollers may be used to direct object 34 flow on the modular conveyor assembly 10. For example, a flow of objects 34 could be divided, shifted, concentrated, or manipulated in another way as desired.

FIGS. 28-36 are directed to conveyor modules that carry variable height rollers used for creating a positive stop on the surface of a conveyor belt 10 that moves along with the conveyor and has the ability to change height relative to the chain surface 24 to engage objects 34 then release them.

The variable height rollers include protrusions that are mounted on the surface 24 of belt 10 in such a way as to enable the "height" with reference to the surface 24 of the belt 10 and/or other protrusions (e.g., a roller 44) on the belt 10 to be altered up or down. A portion of the protrusion will be engaged either underneath or on the side of the belt 10 to alter the position of the protrusion on top of the belt 10.

A main body of the protrusion will be mounted above the surface 24 of the conveyor belt 10 as to be in line or flush with a series of rollers 44 mounted to the surface of the belt 44 as discussed above.

Figure 28:
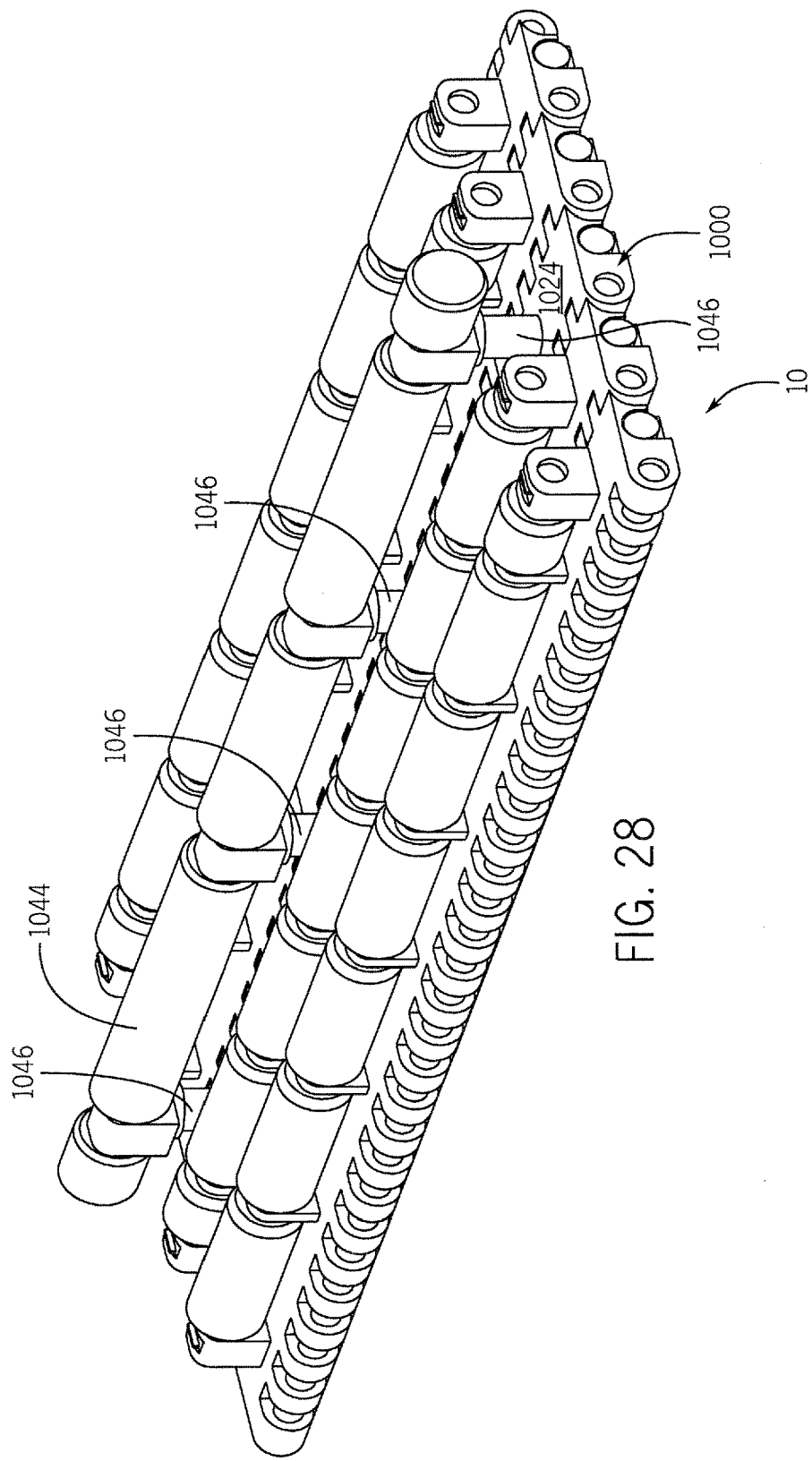
FIG. 28 is a pictorial view of a variable height roller module arranged in the modular conveyor belt of FIG. 1.
Figure 29:
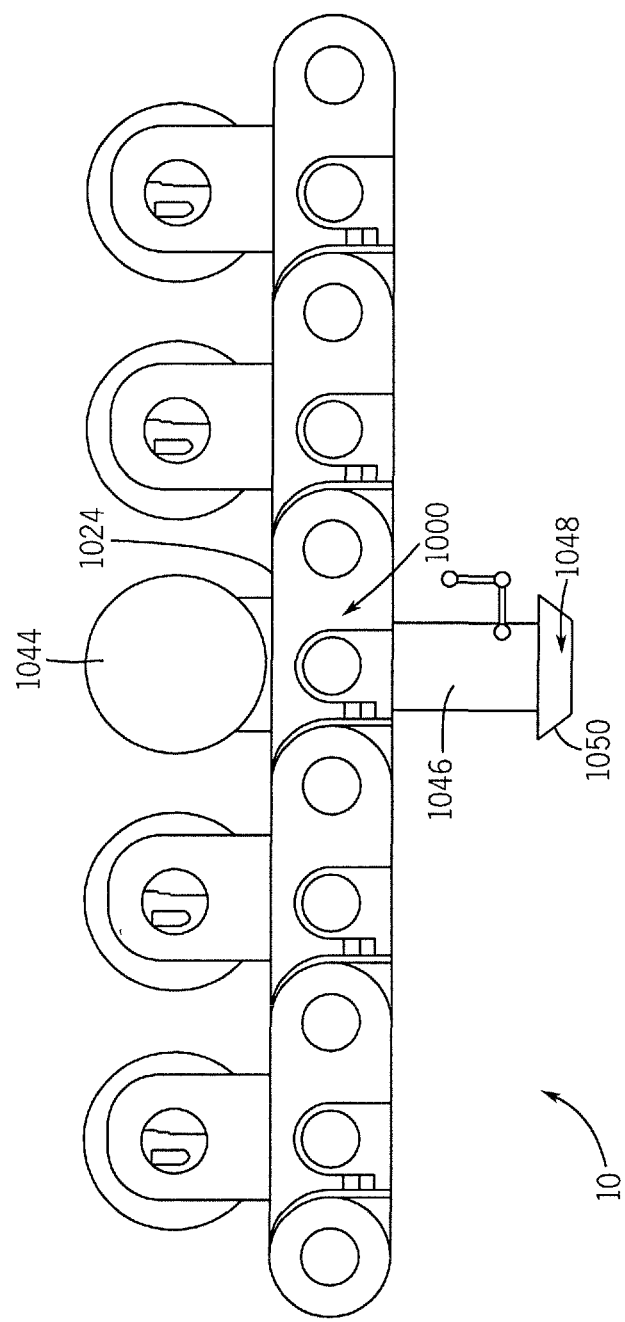
FIG. 29 is a side view of the variable height roller module of FIG. 28.

Turning to the exemplary embodiments of the variable height rollers, FIGS. 28 and 29 show a module 1000 that defines a top surface 1024 and a plurality of apertures (not shown) formed through the top surface 1024. A variable height roller in the form of a continuous roller 1044 is connected to four protrusions 1046 that are sized to slip fittingly engage the apertures through the top surface 1024. As shown clearly in FIG. 29, each of the protrusions 1046 includes an end stop 1048 that is larger than the apertures and inhibits the protrusion 1046 from escaping the aperture. The end stop 1048 defines a sloped profile 1050 that will be discussed below relative to the operation of the module 1000. The continuous roller 1044 is actuatable between a raised position shown in FIG. 28 and a lowered position shown in FIG. 29. The continuous roller 1044 could be activated via a clutch such as the clutches 54, 154, 554 discussed above or may be a simple idle roller that is free to rotate about a static axis.

Figure 30:
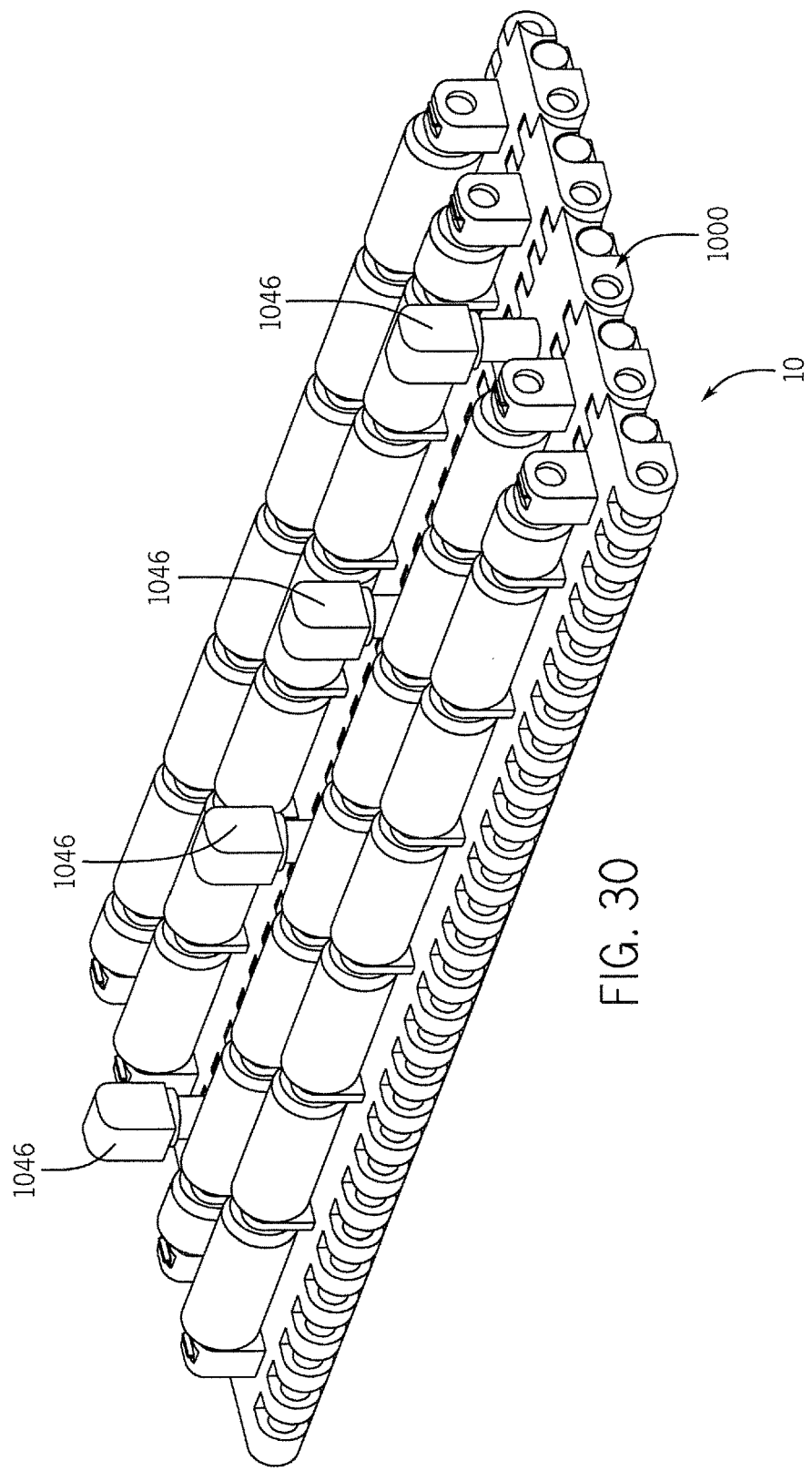
FIG. 30 is a pictorial view of another variable height roller module arranged in the modular conveyor belt of FIG. 1.
Figure 31:
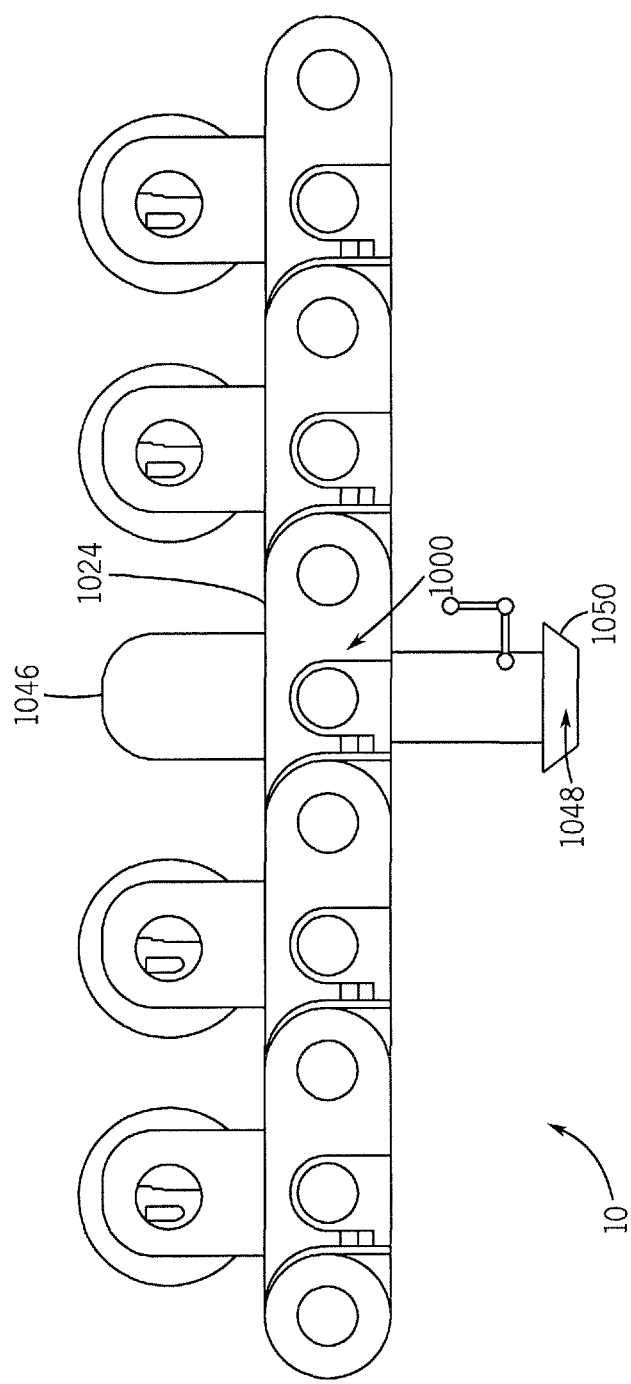
FIG. 31 is a side view of the variable height roller module of FIG. 30.

FIGS. 30 and 31 illustrate an embodiment that includes protrusions 1046 but eliminates the continuous roller 1044. The protrusions 1046 may include apertures sized to receive and axle, a bar, or may define another shape than shown to provide the desired effect on the objects 34 being moved along the conveyor.

Figure 32:
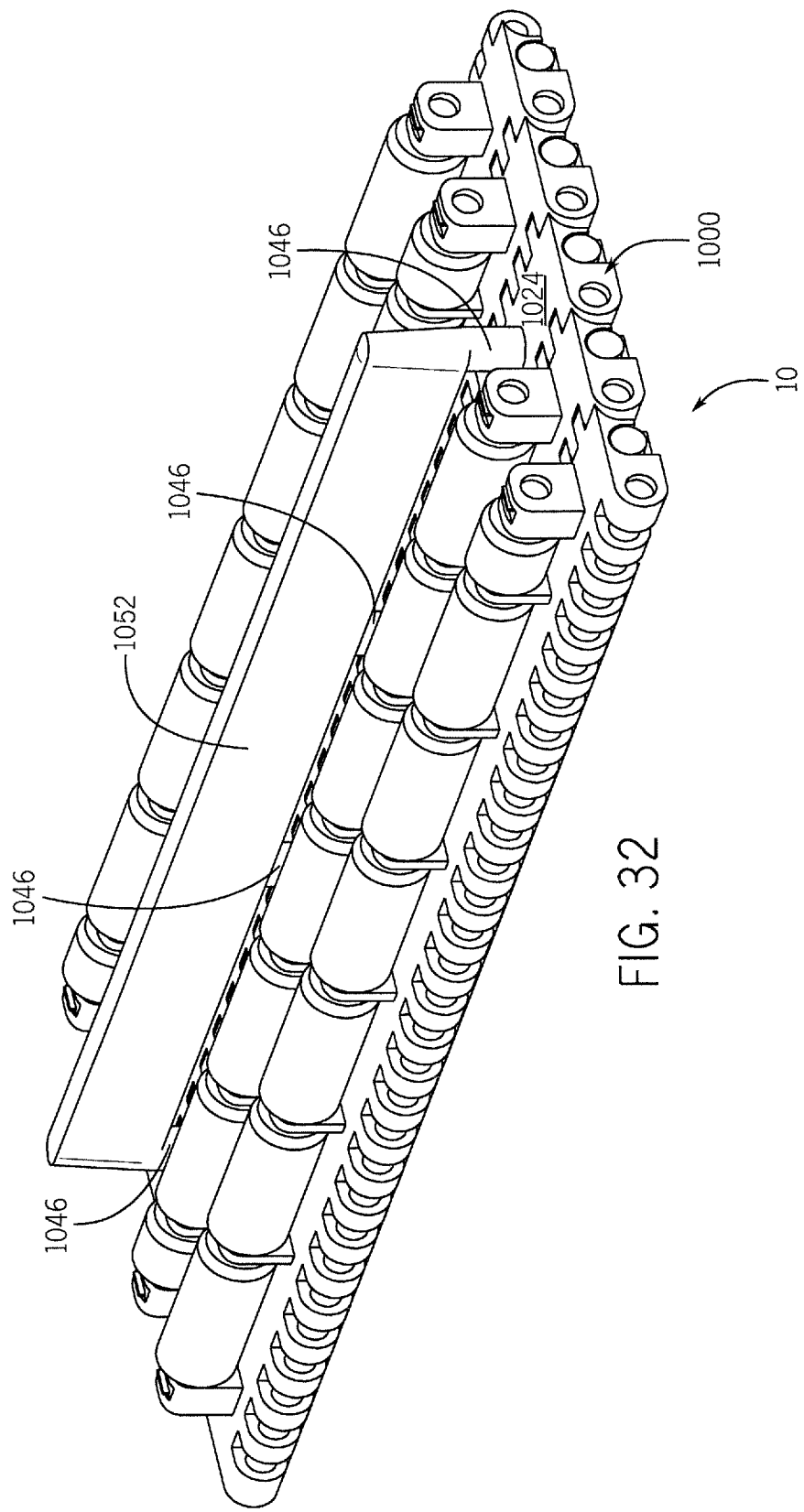
FIG. 32 is a pictorial view of another variable height roller module arranged in the modular conveyor belt of FIG. 1.
Figure 33:
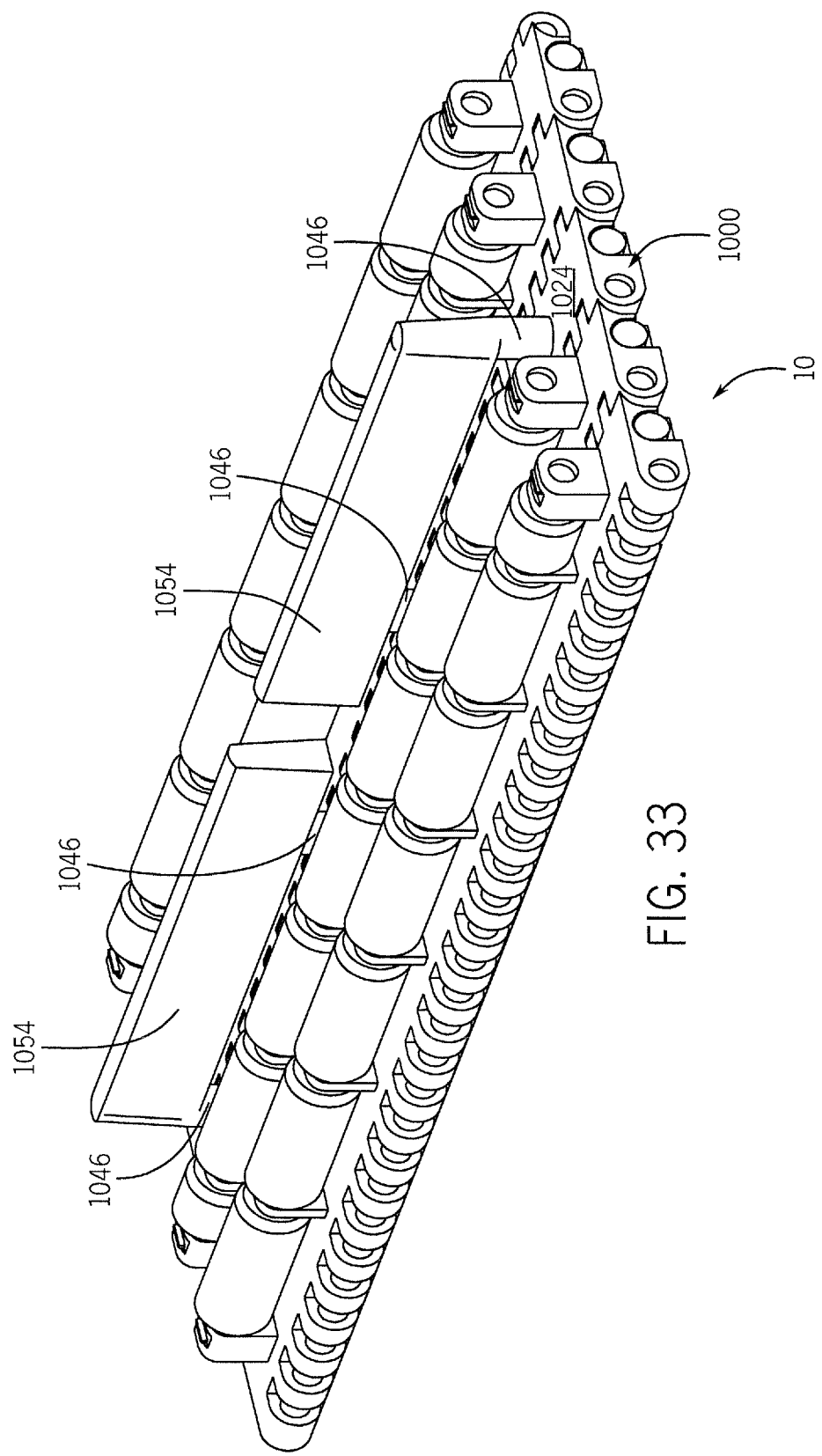
FIG. 33 is a pictorial view of another variable height roller module arranged in the modular conveyor belt of FIG. 1.
Figure 34:
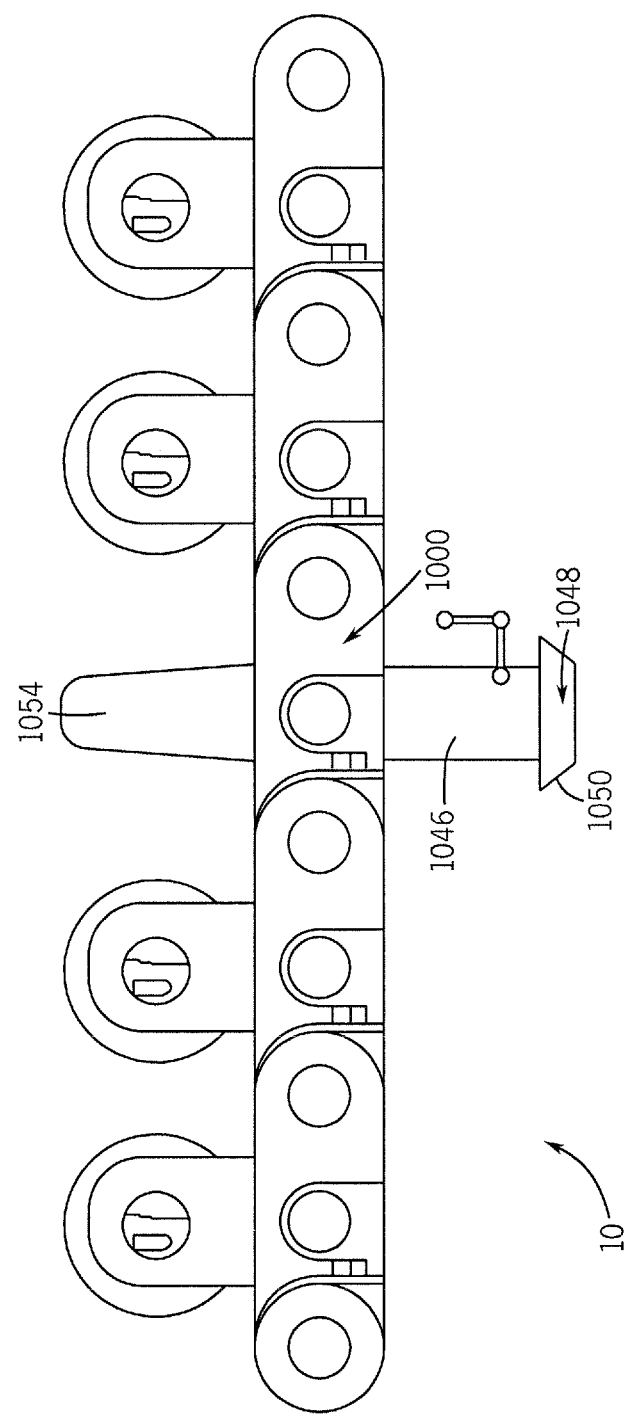
FIG. 34 is a side view of the variable height roller module of FIG. 33.

FIG. 32 shows an embodiment where the continuous roller 1044 is replaced with a blade 1052 coupled to the protrusions 1046. FIGS. 33 and 34 show and embodiment where a pair of blades 1054 are utilized.

Operation of the variable height rollers will be discussed below with reference to FIGS. 35 and 36. Current methods for creating specific product spacing require line designs that are complicated. Adding to the complexity is the increased cost for additional controls, drive components and increased floor space. The invention utilizes the variable height rollers discussed above and the active control roller tops discussed above to control object positioning in the conveyor system by accelerating or decelerating the object until it contacts the variable height roller. This enables objects of any size and geometry to be specifically positioned in relation to other objects on the conveyor system.

Figure 35:
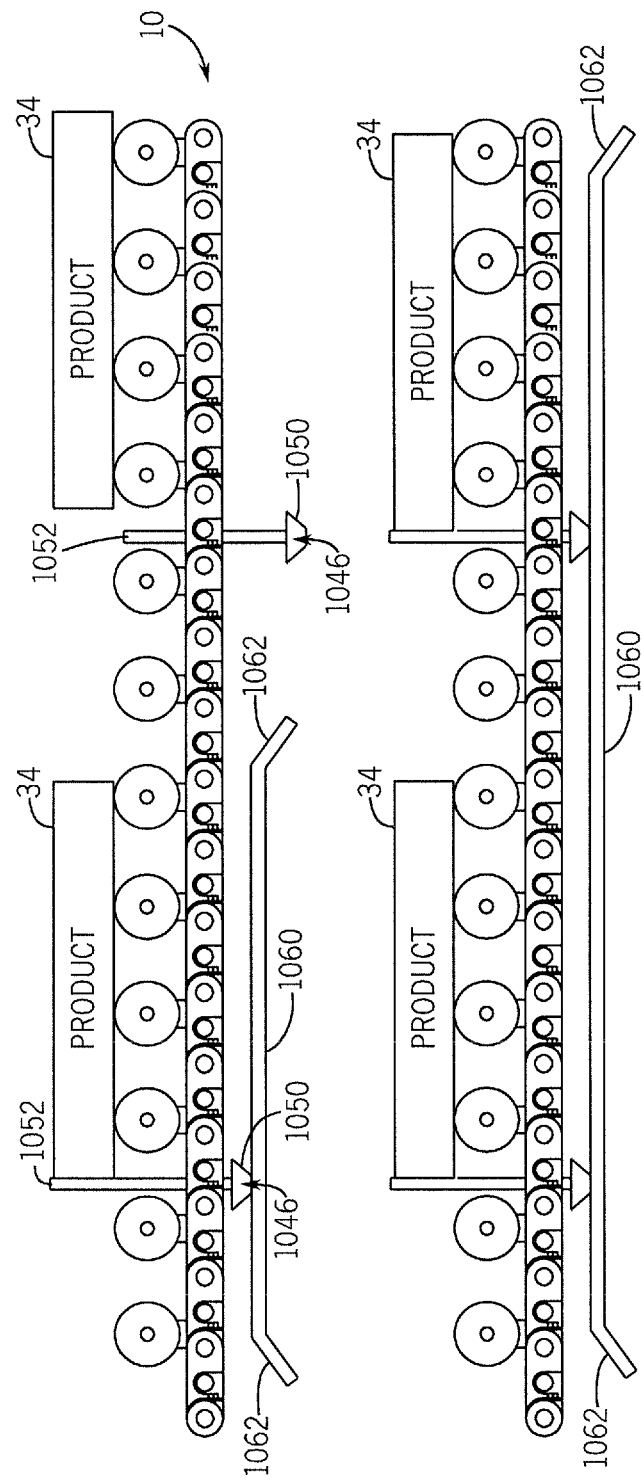
FIG. 35 is a diagram representing a sorting operation utilizing the variable height rollers of FIG. 32.

As shown in FIG. 35, the conveyor system may include an actuator in the form of a bar 1060 arranged to engage the end stops 1048 of the protrusions 1046. The bar 1060 includes ramps 1062 that cooperate with the profiles 1050 to smoothly raise and lower the variable height rollers 1052. As shown in the lower image, the bar 1060 may be adjusted to any length, as desired.

Figure 36:
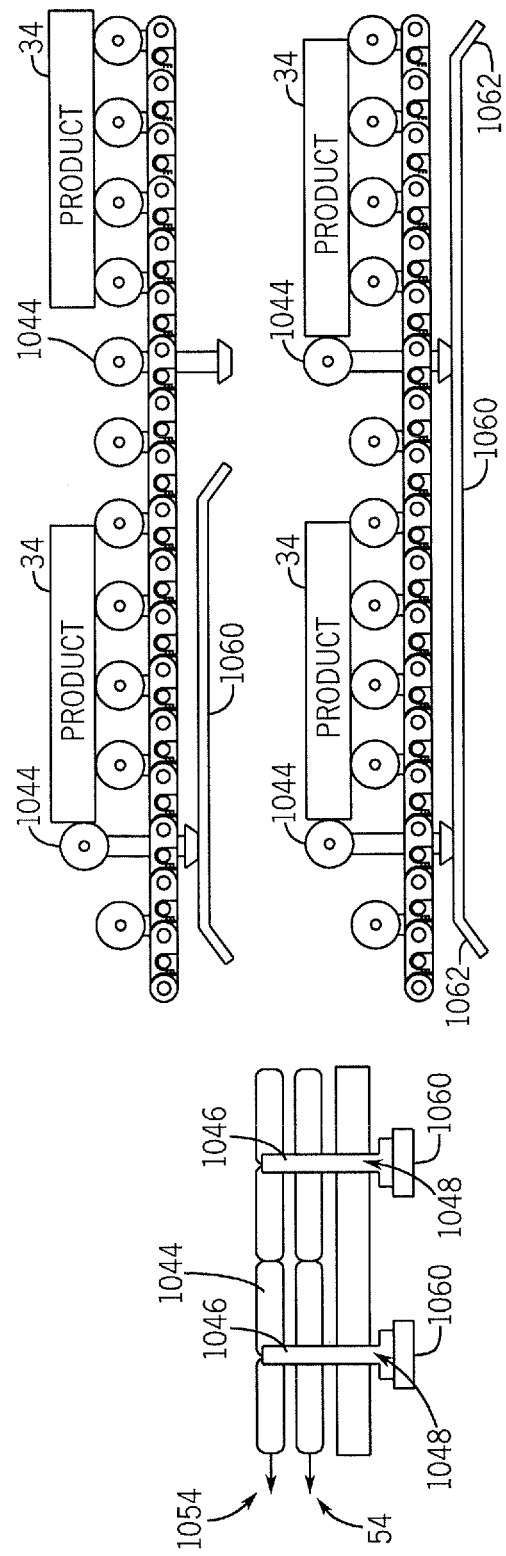
FIG. 36 is a diagram representing a sorting operation utilizing the variable height rollers of FIG. 28.

FIG. 36 shows a system similar to FIG. 36 but utilizing the continuous rollers 1044 and a clutch 1054 to actively control the rotation of the continuous roller 1044 in a manner similar to that discussed above with respect to clutch 54 and modules 12.

Activating the rollers 44 to rotate at a greater velocity then the conveyor belt 10 allows the object 34 to be accelerated to a variable height roller 1044. Activating the rollers 44 to rotate at a slower velocity then the conveyor belt 10 allows the product to decelerate to a variable height roller 1044. The object 34 may then be held in position by the variable height roller 1044 to create specific spacing between objects 34 on the conveyor belt 10. Deactivating a variable height roller 1044 will release the object 34. This process will not disrupt the flow of objects 34 in front of or behind the subject object 34 and be able to handle multiple object geometries and weights.

The positive stop in the form of the variable height roller and method for moving the object to the positive stop are contained in a single belt 10 or chain. The activated variable height roller 1044 can alter the object position without additional equipment and with minimal contact pressure.

The activation of the rollers 44 or 1044 occurs on the outer edges of the system, thus creating a simpler system design. The system is also capable of various different product handling scenarios with a single length of chain or belt 10 eliminating extra costly components (drives, gearboxes, vfd, etc).

The belt design is more flexible, allowing for activation on the top or bottom of the clutch 54 or 1054. This allows for forward or backward movement of the object in the system.

While there has been shown and described what are at present considered the preferred embodiments of the invention, it will be obvious to those skilled in the art that various changes and modifications can be made therein without departing from the scope of the invention defined by the appended claims. For example, the individual features described in the drawings may include one or more features from another embodiment. For example, the coaxial axles 542' and 542" of FIG. 24 may be arranged in the web of the module 12 as shown in FIGS. 25 and 26.

We claim:

1. A method of conveying an object on a modular conveying assembly including
    a plurality of roller bodies, each roller body having a top surface, a driven axle mounted to the body for conveyance therewith, a roller fixed to the driven axle, and a driven surface fixed to the driven axle, the rollers defining a support plane,
    a driving member selectively engaging the driven surfaces to affect rotation of the driven axle,
    a positive stop body coupled to the plurality of roller bodies and including a positive stop movable relative to the positive stop body between a first position and a second position, the positive stop extends above the support plane in the second position, and
    a positive stop actuator selectively engaging the positive stop to move the positive stop between the first position and the second position,
    the method comprising:
    moving the plurality of roller bodies and the positive stop body at a conveyance speed;
    supporting the object on the rollers;
    conveying the object in a conveying direction at the conveyance speed;
    engaging the positive stop with the positive stop actuator to move the positive stop into the second position; and
    engaging the driving member with the driven surface of at least one roller body to affect rotation of the driven axle and bias the object toward the positive stop arranged in the second position;
    wherein engaging the driving member with the driven surface of at least one roller body includes affecting the rotation of the driven axle such that the roller decelerates the movement of the object relative to the conveyance speed such that positive stop comes into contact with the object.

2. The method of claim 1, wherein engaging the positive stop with the positive stop actuator includes engaging a projection of the positive stop with a bar of the positive stop actuator arranged below the positive stop body.

3. The method of claim 1, and further comprising biasing the positive stop toward the first position with gravity.

4. The method of claim 1, wherein engaging the positive stop with the positive stop actuator includes engaging an end stop of the positive stop with a bar of the positive stop actuator.

5. The method of claim 1, wherein engaging the driving member with the driven surface of at least one roller body includes affecting the rotation of the driven axle such that the roller accelerates the movement of the object relative to the conveyance speed.

6. The method of claim 1, and further comprising arranging the driving member and the positive stop actuator in a manipulation zone defining a predetermined length along the modular conveying assembly.

7. The method of claim 6, wherein the positive stop actuator includes a bar that extends substantially the entire predetermined length.

8. The method of claim 6, wherein engaging the driving member with the driven surface includes engaging the driving member with the driven surfaces of roller bodies within the manipulation zone and further comprising at least one of accelerating and decelerating the object within the manipulation zone.

9. The method of claim 1, wherein the modular conveying assembly on which the method of conveying the object on further includes the positive stop including at least one of another roller and a blade, a projection extending through an aperture formed in the positive stop body, the projection including an end stop inhibited from entering the aperture, the end stop defining a slope surface, and the positive stop actuator including a bar positioned below the positive stop body, the bar including a ramp.

10. A method of conveying an object on a modular conveying assembly including
    a plurality of roller bodies, each roller body having a top surface, a driven axle mounted to the body for conveyance therewith, a roller fixed to the driven axle, and a driven surface fixed to the driven axle, the rollers defining a support plane,
    a driving member selectively engaging the driven surfaces to affect rotation of the driven axle,
    a positive stop body coupled to the plurality of roller bodies and including a positive stop movable relative to the positive stop body between a first position and a second position, the positive stop extends above the support plane in the second position, and
    a positive stop actuator selectively engaging the positive stop to move the positive stop between the first position and the second position,
    the method comprising:
    moving the plurality of roller bodies and the positive stop body at a conveyance speed;
    supporting the object on the rollers;
    conveying the object in a conveying direction at the conveyance speed;
    engaging the positive stop with the positive stop actuator to move the positive stop into the second position; and
    engaging the driving member with the driven surface of at least one roller body to affect rotation of the driven axle and bias the object toward the positive stop arranged in the second position;
    wherein engaging the driving member with the driven surface of at least one roller body includes affecting the rotation of the driven axle such that the roller accelerates the movement of the object relative to the conveyance speed such that the object comes into contact with the positive stop.

11. The method of claim 10, wherein engaging the positive stop with the positive stop actuator includes engaging a projection of the positive stop with a bar of the positive stop actuator arranged below the positive stop body.

12. The method of claim 10, and further comprising biasing the positive stop toward the first position with gravity.

13. The method of claim 10, wherein engaging the positive stop with the positive stop actuator includes engaging an end stop of the positive stop with a bar of the positive stop actuator.

14. The method of claim 10, wherein engaging the driving member with the driven surface of at least one roller body includes affecting the rotation of the driven axle such that the roller decelerates the movement of the object relative to the conveyance speed.

15. The method of claim 10, and further comprising arranging the driving member and the positive stop actuator in a manipulation zone defining a predetermined length along the modular conveying assembly.

16. The method of claim 15, wherein the positive stop actuator includes a bar that extends substantially the entire predetermined length.

17. The method of claim 15, wherein engaging the driving member with the driven surface includes engaging the driving member with the driven surfaces of roller bodies within the manipulation zone and further comprising at least one of accelerating and decelerating the object within the manipulation zone.

18. The method of claim 10, wherein the modular conveying assembly on which the method of conveying the object on further includes the positive stop including at least one of another roller and a blade, a projection extending through an aperture formed in the positive stop body, the projection including an end stop inhibited from entering the aperture, the end stop defining a slope surface, and the positive stop actuator including a bar positioned below the positive stop body, the bar including a ramp.

19. A method of conveying an object on a modular conveying assembly including
 a plurality of roller bodies, each roller body having a top surface, a driven axle mounted to the body for conveyance therewith, a roller fixed to the driven axle, and a driven surface fixed to the driven axle, the rollers defining a support plane,
 a driving member selectively engaging the driven surfaces to affect rotation of the driven axle,
 a positive stop body coupled to the plurality of roller bodies and including a positive stop movable relative to the positive stop body between a first position and a second position, the positive stop extends above the support plane in the second position, and
 a positive stop actuator selectively engaging the positive stop to move the positive stop between the first position and the second position,
 the method comprising:
 moving the plurality of roller bodies and the positive stop body at a conveyance speed;
 supporting the object on the rollers;
 conveying the object in a conveying direction at the conveyance speed;
 engaging the positive stop with the positive stop actuator to move the positive stop into the second position;
 engaging the driving member with the driven surface of at least one roller body to affect rotation of the driven axle and bias the object toward the positive stop arranged in the second position;
 arranging the driving member and the positive stop actuator in a manipulation zone defining a predetermined length along the modular conveying assembly; and
 at least one of accelerating or decelerating the object into engagement with the positive stop within the manipulation zone.

20. The method of claim 19, wherein the positive stop actuator includes a bar that extends substantially the entire predetermined length.

21. The method of claim 19, wherein engaging the driving member with the driven surface includes engaging the driving member with the driven surfaces of roller bodies within the manipulation zone.

22. The method of claim 19, wherein the modular conveying assembly on which the method of conveying the object on further includes the positive stop including another roller, a projection extending through an aperture formed in the positive stop body, the projection including an end stop inhibited from entering the aperture, the positive stop being biased toward the first position by gravity, the end stop defining a slope surface, the positive stop actuator including a bar positioned below the positive stop body, the bar including a ramp, and the positive stop body including at least two positive stops.

* * * * *